United States Patent [19]

Patel

[11] Patent Number: 5,220,596
[45] Date of Patent: Jun. 15, 1993

[54] METHOD AND APPARATUS FOR PROPAGATING A NETWORK PROFILE

[75] Inventor: Bipin Patel, San Jose, Calif.

[73] Assignee: Rolm Systems, Santa Clara, Calif.

[21] Appl. No.: 708,136

[22] Filed: May 30, 1991

[51] Int. Cl.$^5$ .................. H04M 11/00; H04M 3/50; H04M 7/00

[52] U.S. Cl. ........................... 379/94; 379/89; 379/207

[58] Field of Search ............ 379/94, 96, 97, 98, 379/88, 89, 207, 221

[56] References Cited

U.S. PATENT DOCUMENTS 4,790,003 12/1988 Kepley et al. .................. 379/88
4,933,967 6/1990 Lo et al. .......................... 379/89

Primary Examiner—James L. Dwyer
Assistant Examiner—Stella L. Woo

[57] ABSTRACT

A method for automatically propagating subscriber names and their associated name headers to remote sites from a local site in a PhoneMail network, includes adding a profile propagation status field to a data base field for each mailbox of a subscriber in each PhoneMail system in the network. A predetermined number of bits are reserved within the profile propagation status fields, for representing the status at any given subscriber network profile relative to a corresponding remote site, with different patterns of the bits conveying different status messages. Subscribers at a local site are selected for sending their associated network profiles to the data bases of selected remote sites. After the selection process, the network profiles are propagated to the remote sites.

20 Claims, 22 Drawing Sheets

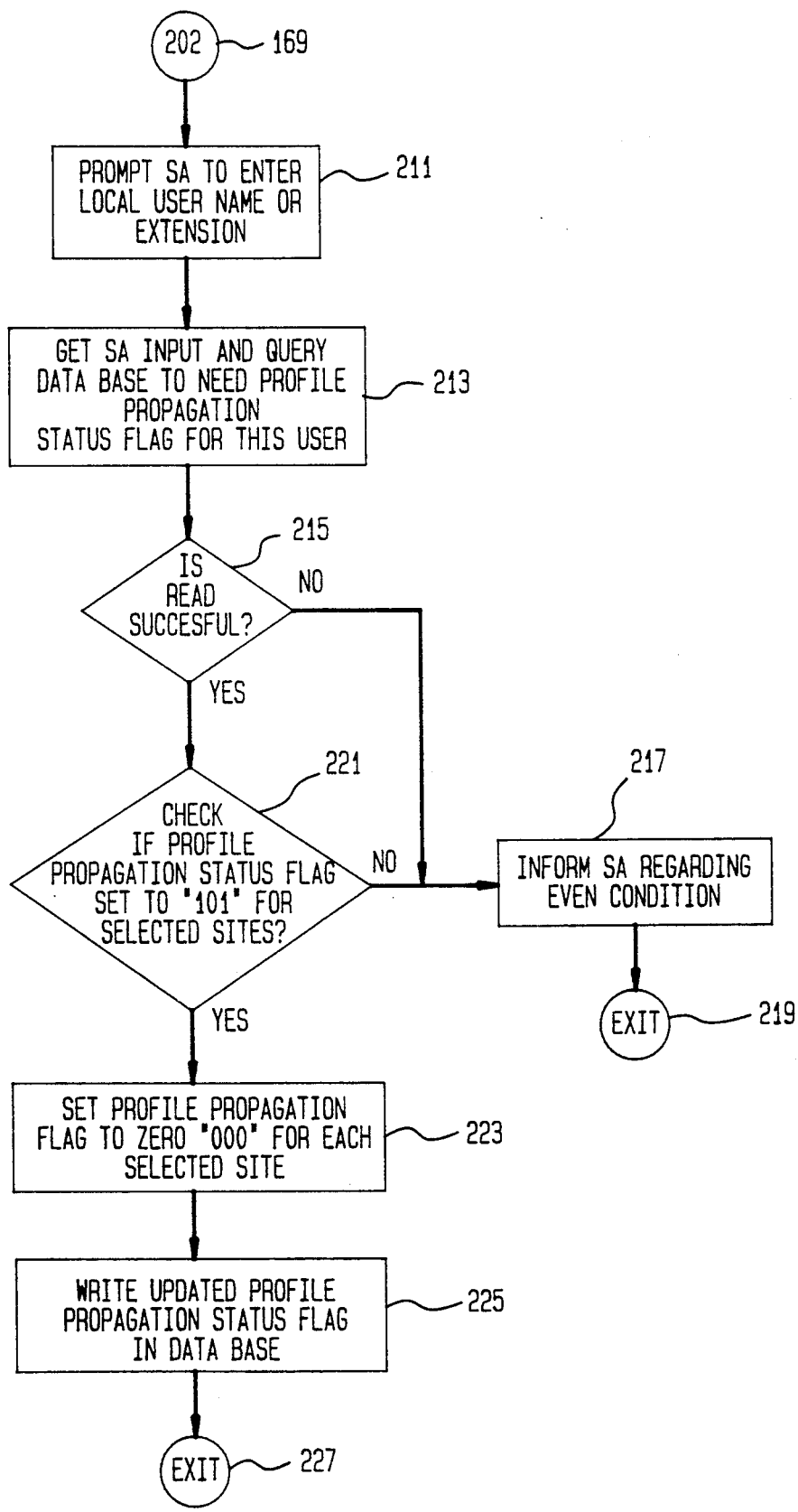

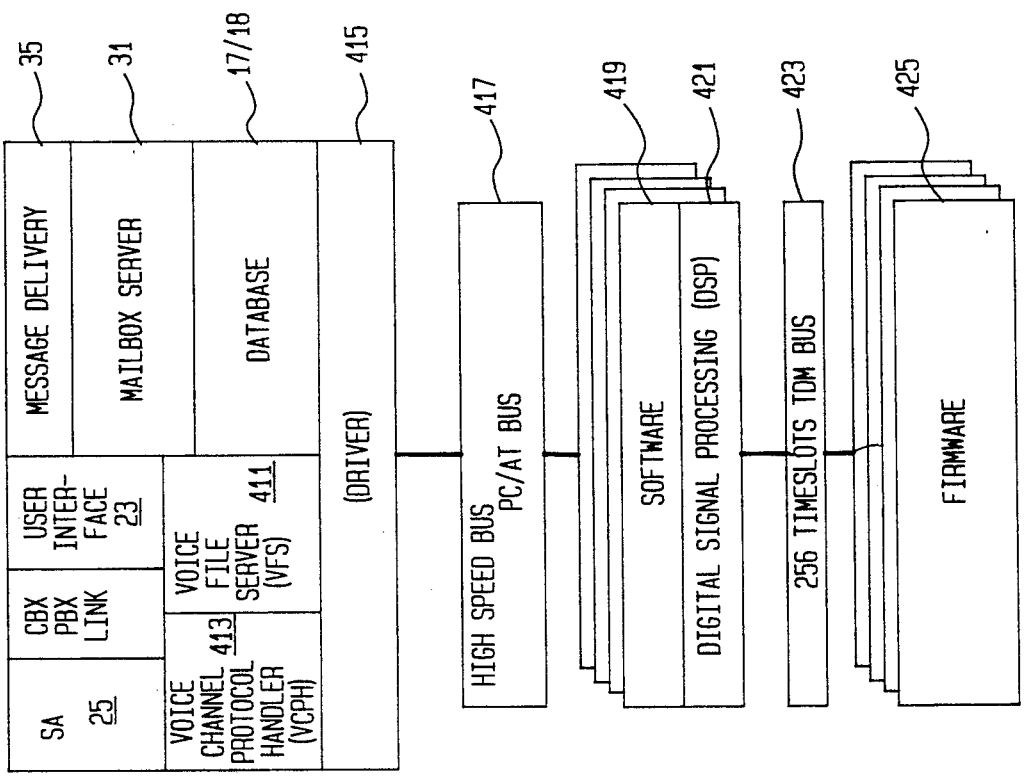
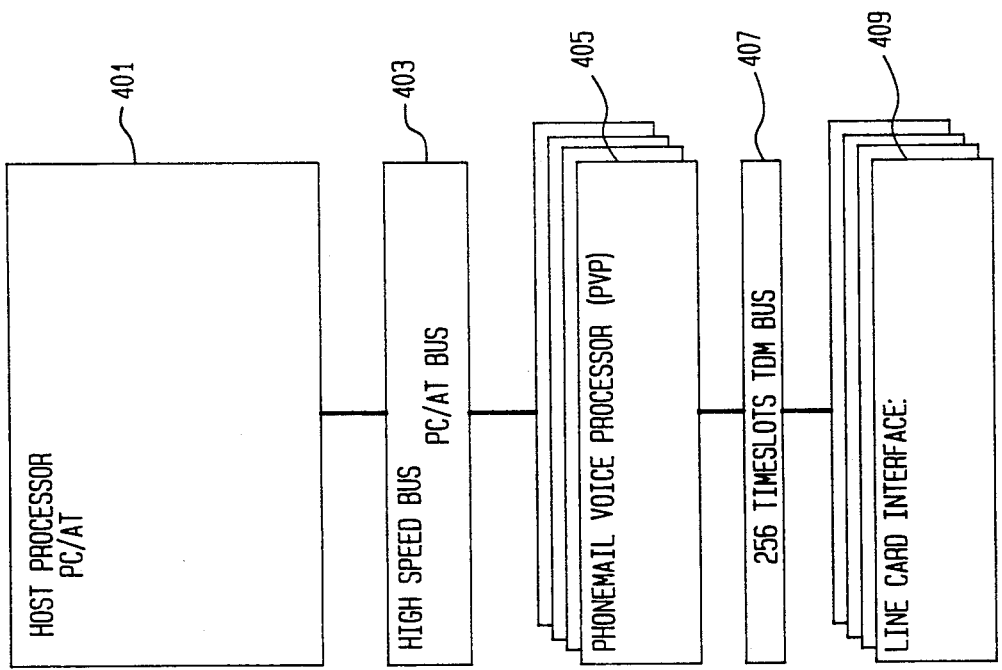

METHOD AND APPARATUS FOR PROPAGATING A NETWORK PROFILE

FIELD OF THE INVENTION

The present invention relates generally to voice messaging networks, and more particularly to a scheme to propagate subscriber names and name headers to remote sites to allow remote users to address destinations by name or extension entry.

BACKGROUND OF THE INVENTION

In voice messaging networks, to provide name confirmations when a user dials a destination number through a touch-tone telephone keypad, the local system must query its data base to determine if name stored therein correspond to the given numeric input received from the telephone keypad. Typically, a touch-tone telephone keypad includes letters such as "A", "B", or "C", which each correspond to numeric digit two on the keypad. Also, numeric digit three is used to designate the keypad letters "D", "E", or "F", respectively, with other numeric digits being used to designate other of the letters on the keypad, in a similar manner. Accordingly, a user may dial combinations of letters on a keypad for designating a particular name, with the letters selected being outputted from the keypad as a combination of numeric digits, which are translated into possible name combinations in the voice mail system. When a site or recipient receives the numeric coding, the receiving site searches its data base to obtain possible names that are defined by the numeric input. If a name on site is identified, the associated extension is connected by the system to the calling party, or a message is taken if the extension does not answer, and possibly a message from the extension may be given to the calling party, for example. Also, for example, a subscriber in a voice messaging system, who does not know another subscriber's number, can call that subscriber by the subscriber's name, or can address a message to another subscriber by that subscriber's name.

In a system known as PhoneMail (registered trademark of Rolm Systems, Santa Clara, Calif.), each subscriber must first be assigned a unique mailbox in the system. Thereafter, the subscriber or the supervisory administrator records the subscriber's name header in association with the mailbox. Accordingly, each mailbox has a unique name and extension associated with it. When a caller wants to address a message to another user, either local or remote, or transfer to such a user, the caller typically provides a numeric name. If a name match occurs during a search process, the PhoneMail operates to play the recorded name for that subscriber mailbox, for permitting the user or caller to hear a voice confirmation of the name he has inputted into the system for purposes of name confirmation.

In prior PhoneMail voice messaging systems, System Administrators (SAs) have to manually add a network profile into their associated local system for each remote subscriber to be permitted access thereto. After adding the network profile, the SA must then record the name headers for the newly added network profiles. The procedure for doing so is very time consuming and cumbersome. For example, to initiate the procedure the SA must obtain the remote subscriber names and their respective extensions (telephone extension numbers). Next, the SA must add one mailbox for each remote subscriber. If any mistakes are made in inputting this data, the SA most likely will not become aware of such a mistake until a subscriber sends a message to the mailbox associated with the error. Also, after inserting all of the mailboxes into the system, the SA also has to voice record the name headers associated with each mailbox, which typically takes considerable time. Also, if the SA mispronounces any of the names, communication problems may result with subscribers in the system.

The present inventor recognized that there is a need in the art for providing a method and apparatus for permitting an SA to send local subscriber names, extensions, and associated name headers to remote sites for automatic reading into the data base at the remote site. Such an automatic transfer of this data will insure data base consistency, and proper vocalizing of the propagated name headers. In addition, such an automated system will permit a new mailbox to be added to a local data base without a remote SA having to be informed of the addition. The local SA will have the ability to propagate the network profile corresponding to the new mailbox to the site of the remote SA, and other selected sites.

SUMMARY OF THE INVENTION

One object of the invention is to provide an improved PhoneMail system.

Another object of the invention is to provide in a voice messaging system a method and apparatus for automatically propagating subscriber names, extensions, and name headers to remote sites from a local site.

These and other objects are satisfied by the method and apparatus of the present invention. More specifically, for the method of the present invention, a new data base field "profile propagation status" is added to each mailbox, and three bits within the associated field are reserved for each remote site, with each mailbox being associated with a given subscriber. The three bits represent the status of an associated subscriber network profile for a corresponding remote site. A different message is conveyed by each one of the eight possible bit patterns associated with the three bits. The patterns, in this example, are as shown below:

| Bit Pattern | Pattern Message |
| --- | --- |
| 000 | No attempt ever made to propagate this file. |
| 001 | The network profile was successfully sent. |
| 010 | The network profile propagation failed, as initiated by the propagate Network Profile command. |
| 011 | The network profile propagation failed, as initiated by normal PhoneMail message delivery operation. |
| 100 | The network profile propagation is in progress. |
| 101 | The network profile is selected for propagation, but not sent yet. |
| 110 | Reserve for future use. |
| 111 | Reserve for future use. |

As a next step, the SA must input to the system the particular user network profiles that are to be propagated to selected remote sites. A new Profile Propagation utility is also added to the system to permit a SA to either select a single subscriber or all subscribers for propagation, or to request a display of all subscriber names/extensions for determining various ones to propagate. For each subscriber selected for profile propagation, the system sets the bit map to a "101" pattern (see above pattern messages) for each remote site. Note that each time a new mailbox is added in the data base, the bit map flag is reset to "000", and later updated to "101" when the associated mailbox is selected for network profile propagation. The system will query the profile propagation status flag for each mailbox upon the SA initiating the profile propagation by manually addressing the system to start propagating network profiles to the selected remote sites.

If the system detects the flag as "101" for a particular mailbox, the PhoneMail creates a message to send the mailbox network profile to the remote site, and update the flag "100". When the PhoneMail completes the transmission of the network profile to the remote site, the flag is updated to "001". If for some reason the PhoneMail is unable to send the network profile, it sets the flag to "010".

In another embodiment of the invention, a PhoneMail system is configured for automatically sending a sending subscriber network profile to a remote destination upon the subscriber sending a message thereto. If for some reason the system fails in transmitting the sender network profile to the remote destination, the flag is set to "011".

BRIEF DESCRIPTION OF THE DRAWINGS

The various embodiments of the present invention are illustrated below in conjunction with accompanying drawings, wherein like items are indicated by the same reference destination, and in which:

FIGS. 7, 8, 9A through 9D, 10, 11A through 11D, and 12 through 15 illustrate flow charts of software for propagating network files from one site to another in one embodiment of the invention;

FIGS. 16 and 17 show block diagrams of the hardware architecture, and software architecture, respectively, for a PhoneMail System incorporating the present invention.

DETAILED DESCRIPTION OF THE INVENTION

Figure 1:
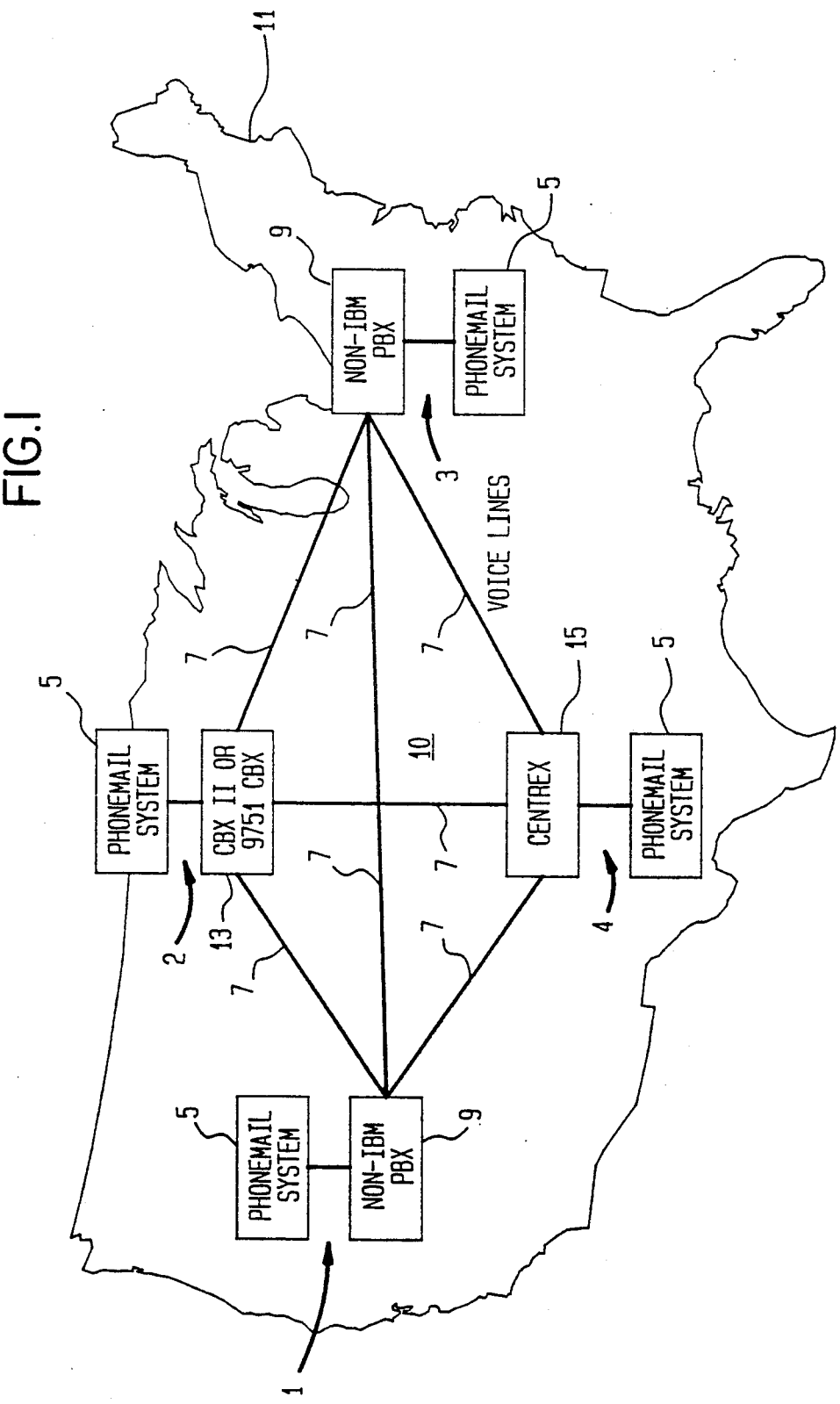
FIG. 1 is a simplified pictorial diagram of a typical PhoneMail network.

In describing various preferred embodiments of the present invention, it may be helpful to first review the operation of a typical PhoneMail Network. With reference to FIG. 1, a PhoneMail Network 10 is shown to include sites 1 through 4, each of which includes a PhoneMail system 5. However, for purposes of illustration, each of the sites 1 through 4 are differently configured, and are connected to one another via voice or telephone lines 7. Note also for purposes of illustration that the sites 1 through 4 are shown within the continental United States 11, but such a PhoneMail network can be worldwide.

Each of the sites 1 through 4 are differently configured in this illustration for example. Site includes a Non-IBM (registered trademark of IBM Corp., Binghamton, NY) PBX 9. Site includes CBX II (CBX is a registered trademark of Rolm Systems, Santa Clara, Calif.) or a 9751 CBX 13, site 3 includes another Non-IBM PBX, and site 4 includes a Centrex system 15. Note that CBX means computerized branch exchange, and PBX means private branch exchange.

Figure 2:
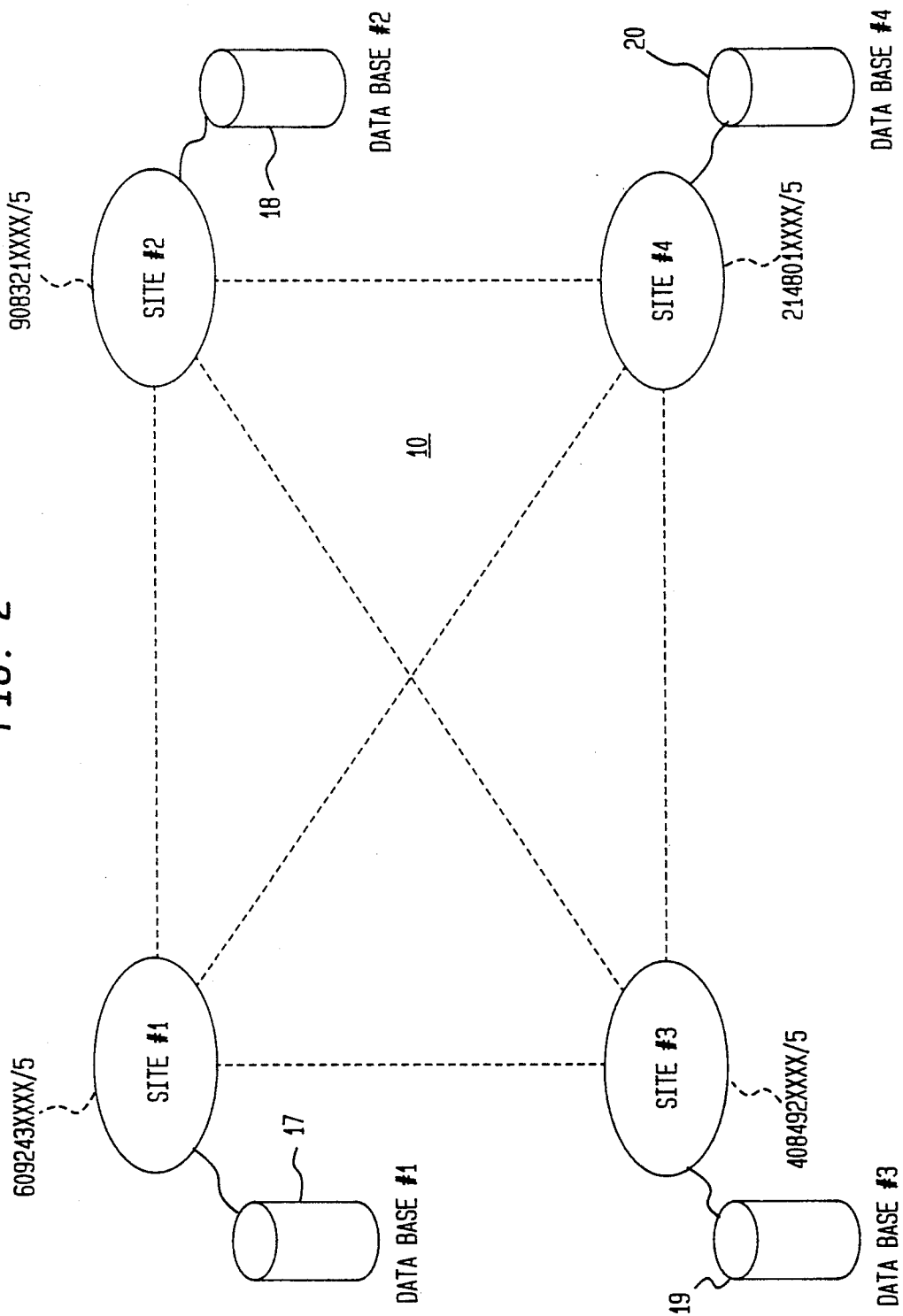
FIG. 2 is a block diagram of a typical PhoneMail network with four sites and associated data bases.

In FIG. 2, the PhoneMail systems 5 at sites 1 through 4 each further include data bases 17 through 20, respectively. In the example shown, at any of the sites 1 through 4, a user sends a message to local users using extensions designated by five digits, and sends messages to remote users having extensions identified by ten digits. The data bases 17 through 20 store the local users' profiles, and network profiles for users on the remote sites.

Figure 3:
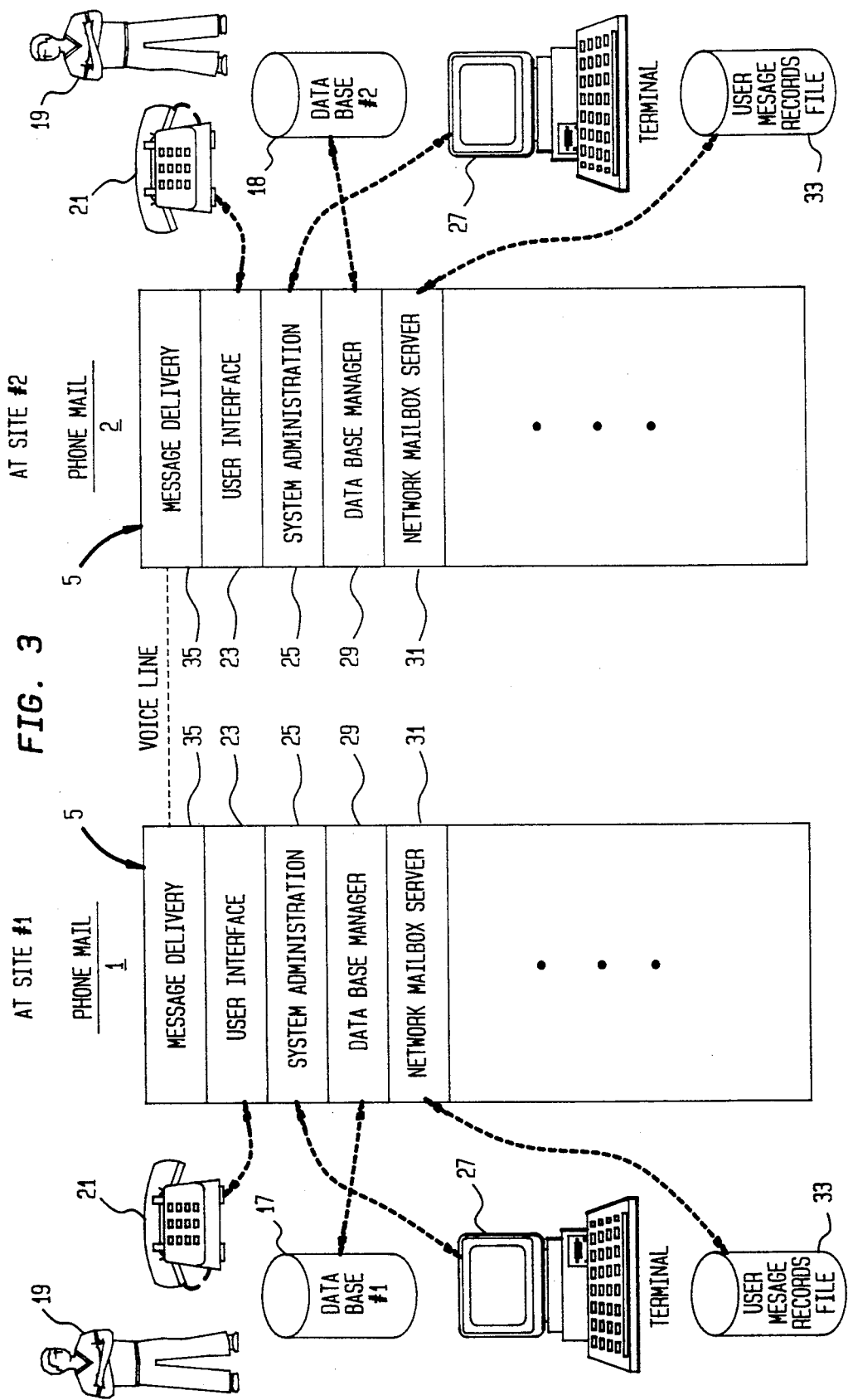
FIG. 3 is a block diagram showing the communication between two sites via the interaction of various devices and modules within the system.

A more detailed block diagram of the communication between sites 1 and 2, for example, is shown in FIG. 3 for the associated PhoneMail systems 5. In this example, each user 19 uses a telephone 21 to interact with an associated user interface module 23 to record or playback voice messages. A System Administration module 25 interacts with the System Administrator (SA) at the associated site 1 or 2, in this example, through a terminal 27, for permitting the SA to perform system configuration and system monitoring. A data base manager module 29 interacts with other associated PhoneMail 5 modules to support data base relate functions. A network mailbox server (NMS) 31 interacts with the associated user interface module 23 and data base manager module 29 to support functions related to voice messages by managing an associated user message records (UMR) file 33. Other modules may be included in a PhoneMail system 5, but for purposes of illustrating the present invention, it is not necessary to show them here. A user 19 interacts with the user interface module 23, and the latter with other modules such as the data base manager 29, to both record a message and address it to local users or remote users 19. Upon detecting a message for transmission to a remote destination, that is to another PhoneMail system 5 at a remote site, a message delivery module 35 at the local site 1 communicates with the message delivery module 35 at the remote site 2 for transmitting the message to the latter.

Figure 4:
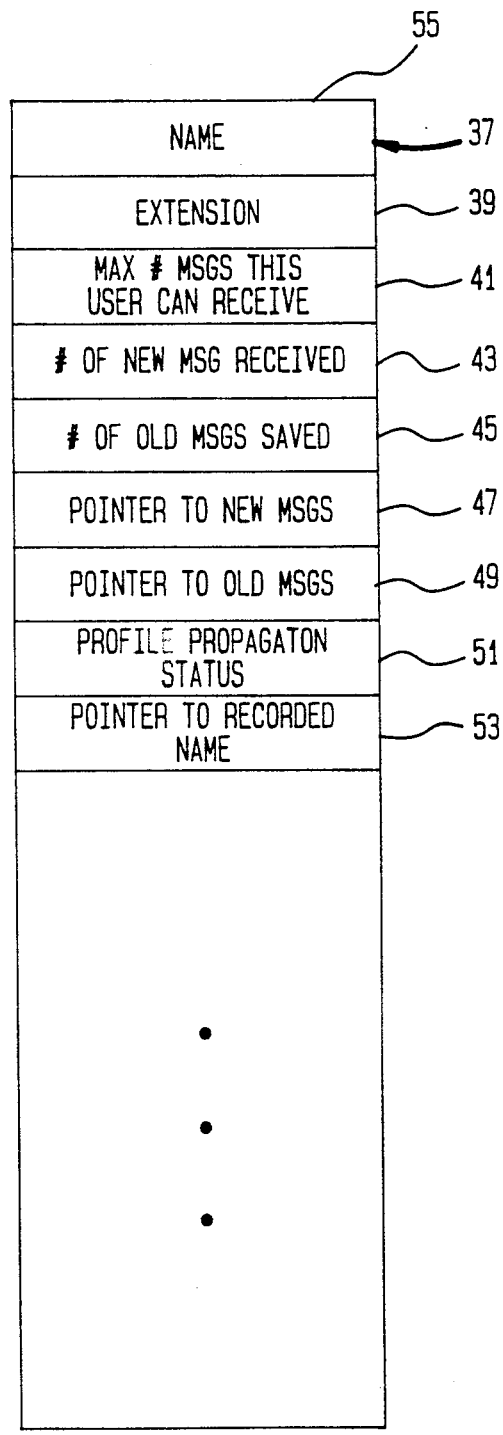
FIG. 4 is a block diagram showing an example of various fields associated with each mailbox of a user for defining a user profile in one embodiment of the invention.

As previously mentioned, in a PhoneMail system 5 each user 19 is assigned a mailbox 37. In FIG. 4, a mailbox 37 is shown containing various fields for defining a user profile record. One field 39 is associated with the user extension number. Another field 41 designates the maximum number of messages that the associated user 19 can receive. Field 43 provides an indication of the number of new messages received, whereas field 45 provides an indication of the number of old messages saved. A field 47 provides a pointer to the new messages, whereas a field 49 provides a pointer to old messages. The field 51 is particularly important to the present invention for showing the profile propagation status. Another field 53 provides a pointer to a recorded name. The name of a user 19 associated with a particular mailbox 37 is provided by field 55. Other fields may also be included in mailbox 37.

As indicated, in a mailbox 37, the profile propagation status field 51 is included in one embodiment of the invention. The field 51 is made large enough to allocate three bits for each remote site in the network 10, for example. Each of the bit patterns associated with these three bits are assigned meanings as given in the table shown above in the Summary of the Invention. However, different configurations may use other than three bits, and different bit patterns for conveying information.

Figure 5:
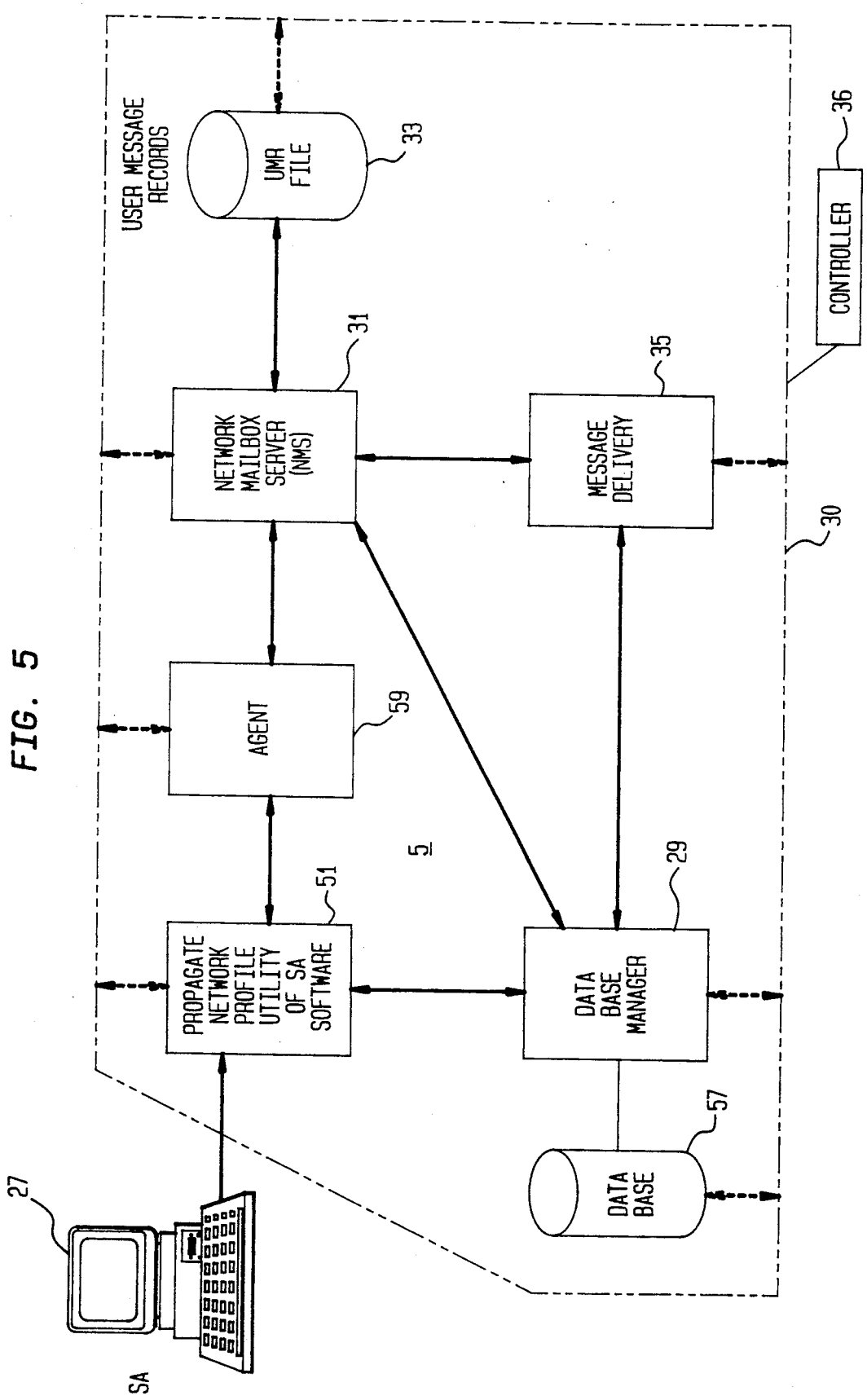
FIG. 5 is a block diagram showing various PhoneMail modules necessary to support profile propagation from one site to another in one embodiment of the invention.

In FIG. 5, a PhoneMail system 5 is shown in a simplified block diagram detailing modules required to support profile propagation from one site to another in one embodiment of the invention. As illustrated, the supervisory administrator (SA) uses a conventional terminal 27 that typically includes a keyboard and display for interacting with the "propagate network profile" utility module 51 of the SA software to select one or more remote sites for the SA to propagate one or more subscriber network profiles. The propagate network profile module 51 is programmed to interact with the data base manager module 29 to keep track of the information supplied by the SA for initiating profile propagation. When initiating the start of the profile propagation program, the profile software for utility module 51 is programmed to create one user message record for each subscriber for each site through interactions with an agent module 59, a network mailbox server (NMS) 31, and the software programming of the data base manager 29. The message delivery module 35 is programmed for detecting when a message is pending for transmission to a remote site, for reacting by communicating with the remote site and delivering the associated network profile 37 to the remote site. The message delivery module 35 is also programmed to interact with the data base manager 29 for updating a propagation status flag and interacting with the network mailbox server 31 for managing the user message records file 33. Note also that the data base manager 29 also interacts with the data base 57 at the local site. A high speed bus 30 is shown in phantom for providing a connection between the modules and a controller 36. The controller 36 can be provided by a PC/AT personal computer, for example.

Figure 6:
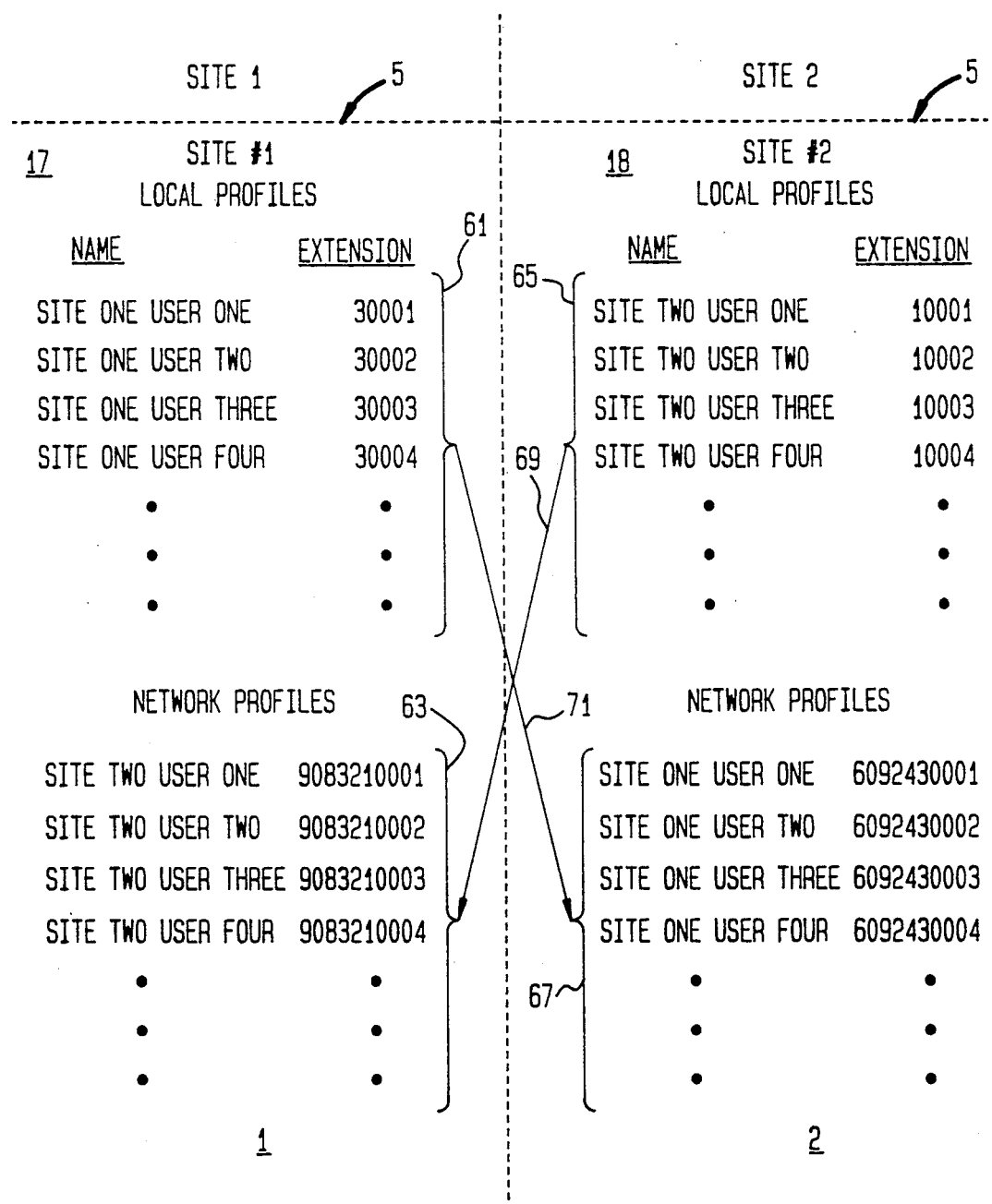
FIG. 6 illustrates the format for local users and network profiles in the data bases of two different sites.

The data base 57 at each site consists of different local profiles and network profiles. As previously indicated, the local profiles are associated with subscribers on site, whereas the network profiles are associated with subscribers at remote sites. An example of data included in a typical data base 57 at sites 1 and 2 is shown in FIG. 6, for example. As shown, the PhoneMail system 5 at site 1 includes a data base 17 having local profiles 61 and network profiles 63. Also, a PhoneMail system 5 at site 2 includes a data base 18 having local profiles 65 and network profiles 67. Note that the users or subscribers for local profiles in a data base each are identified by five digits, whereas users or subscribers in the network profiles are each designated by ten digits, in this example. Other configurations can be used.

The local profiles 61 and 65 at sites 1 and 2, respectively, are each manually inserted by the associated local SA. In one embodiment of the invention, after this is accomplished at each site 1 and 2, the SA at site 2 for example can initiate a profile propagation for transmitting selected local profiles 65 of data base 17 at site I for forming network profiles 63 at the latter site 1, as shown in this example. Similarly, the SA at site 1 can initiate a profile propagation for transmitting selected local profiles 61 of data base 18 at site 2 for forming network profiles 67 in that data base as indicated by arrow 71. In another embodiment of the invention, the profiles can be transmitted when, for example, a user from site 1 sends a message to a user at site 2. The PhoneMail systems 5 are programmed for propagating the sender profile as a network profile to site 2, and propagating the receiver's profile as a network profile for transmission to site 1. Also, note that the network profiles 63 at site 1 and 67 at site 2, can be formed in data bases 17 and 18, respectively, in a manual manner by the System Administrator, as previously indicated above.

Figure 7:
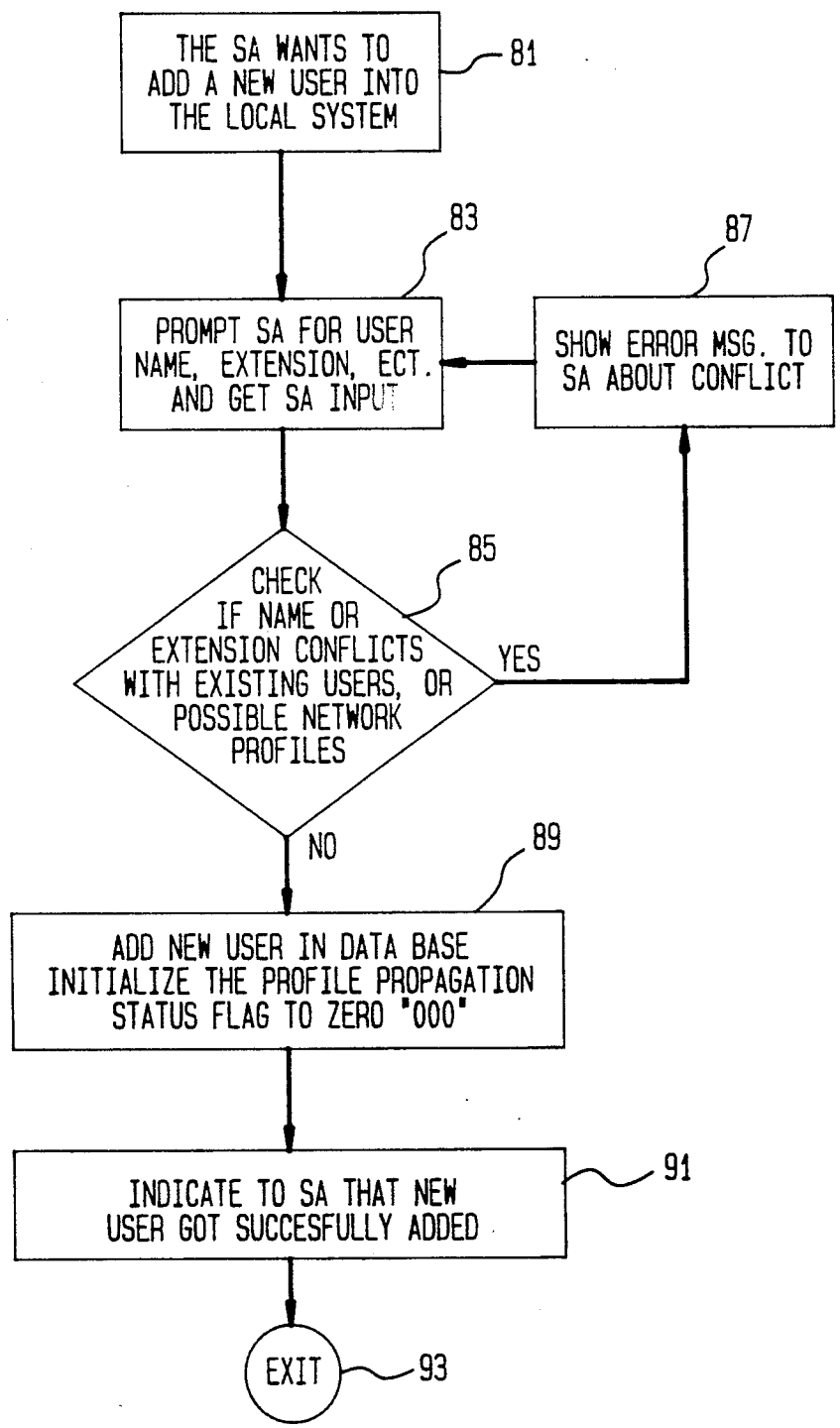

A more detailed description of the programming required for profile propagation in various embodiments of the invention will now be given. The flowchart in FIG. 7 illustrates programming for initializing the profile propagation status to a given value. As shown, the profile propagation status 51 is initialized to zero, that is "000", for all remote sites relative to a local site, when a new user mailbox 37 is added to an associated data base such as 57, for example. More specifically, with reference to FIG. 7, assume as shown in block 81 that at a given site an SA wants to add or insert a new user into the PhoneMail network. The SA operates the keyboard of his terminal 27 to display a menu for selecting a routine for initiating the new user insertion routine. The system administration module 25 receives the system administrator's command for adding a new user mailbox into the local system 5 (block 81). As shown in block 83, the SA is prompted for inserting the new user name, extension, and so forth into the system 5. The system then checks to determine if the new user or subscriber name or extension conflicts with any existing user, or possible network profiles, previously inserted in the data base 57, as shown by block 85. If a conflict exists, the system displays an error message on terminal 27 to alert the SA that there is a conflict as shown by block 87. If no conflicts exist, the new user is added into the data base 57, and the profile propagation status flag is initialized to zero, that is to "000", as shown in block 89. The initializing is completed, the message display is provided to the SA for indicating that the new users mailbox was successfully added, as shown by box 91. The new user or mailbox insertion routine is then exited as shown by balloon or step 93.

Figure 8:
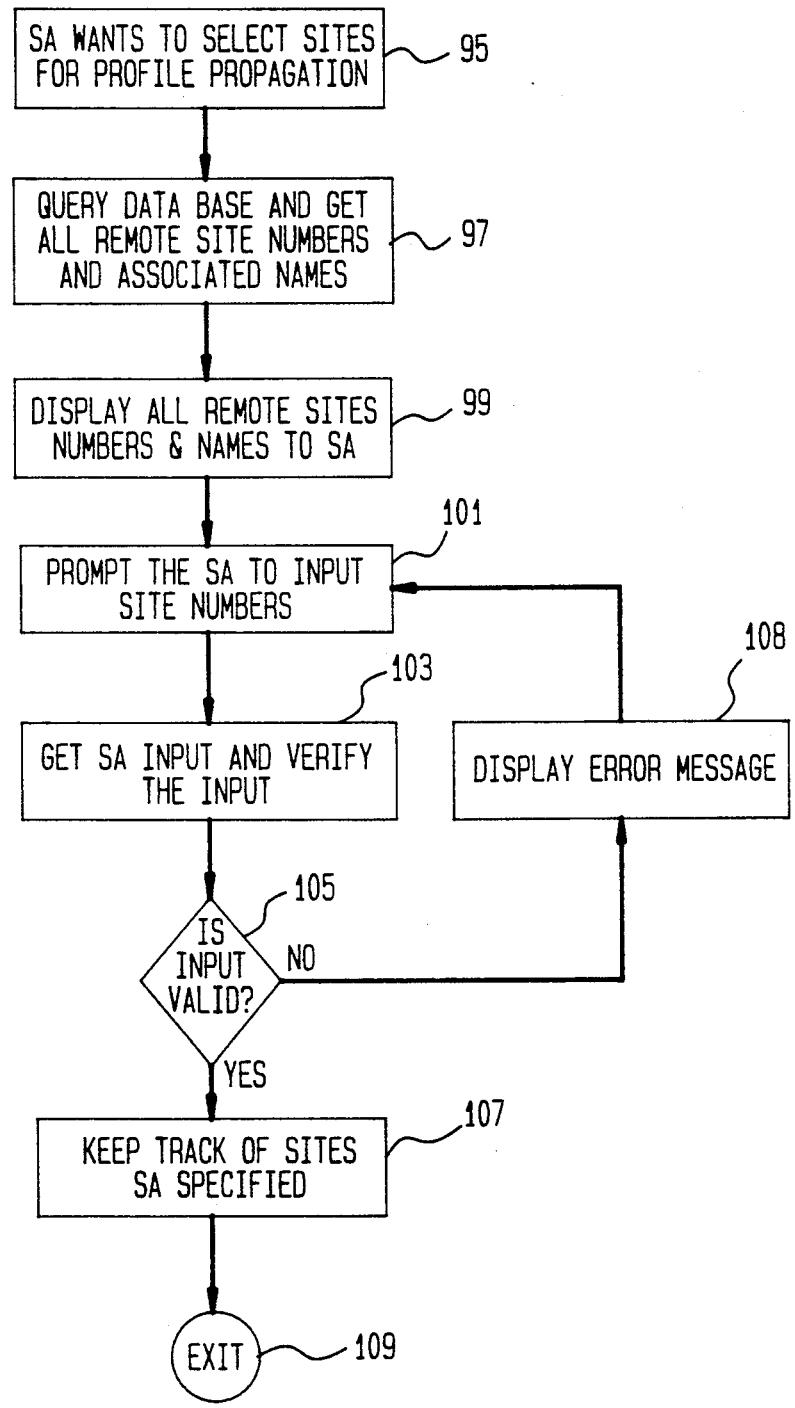

When an SA is ready to select a remote site for profile propagation, he interacts with the PhoneMail system 5 as shown by the flowchart of FIG. 8. Block 95 is indicative of the SA using his terminal 27 to pull up a menu for selecting therefrom the initiation of a profile propagation routine, as illustrated. Immediately after the routine is activated by the SA, the next step is to query the data base 57 for obtaining all remote site numbers and their associated names, as indicated in block 97. This information is then displayed on terminal 27 for review by the SA (see block 99). Next, at block 101 the SA is prompted to enter site numbers to the system. Next in step 103 the input provided by the SA is verified. At step 105, if the input is found to be not valid, step 108 is entered for displaying an error message on terminal 27 to alert the SA that the site number he provided is invalid. If the site number or numbers are found to be valid, the programming routine proceeds to step 107 to maintain a record or keep track of the sites selected by the SA. The routine is then exited as shown by balloon or step 109.

Figure 9A:
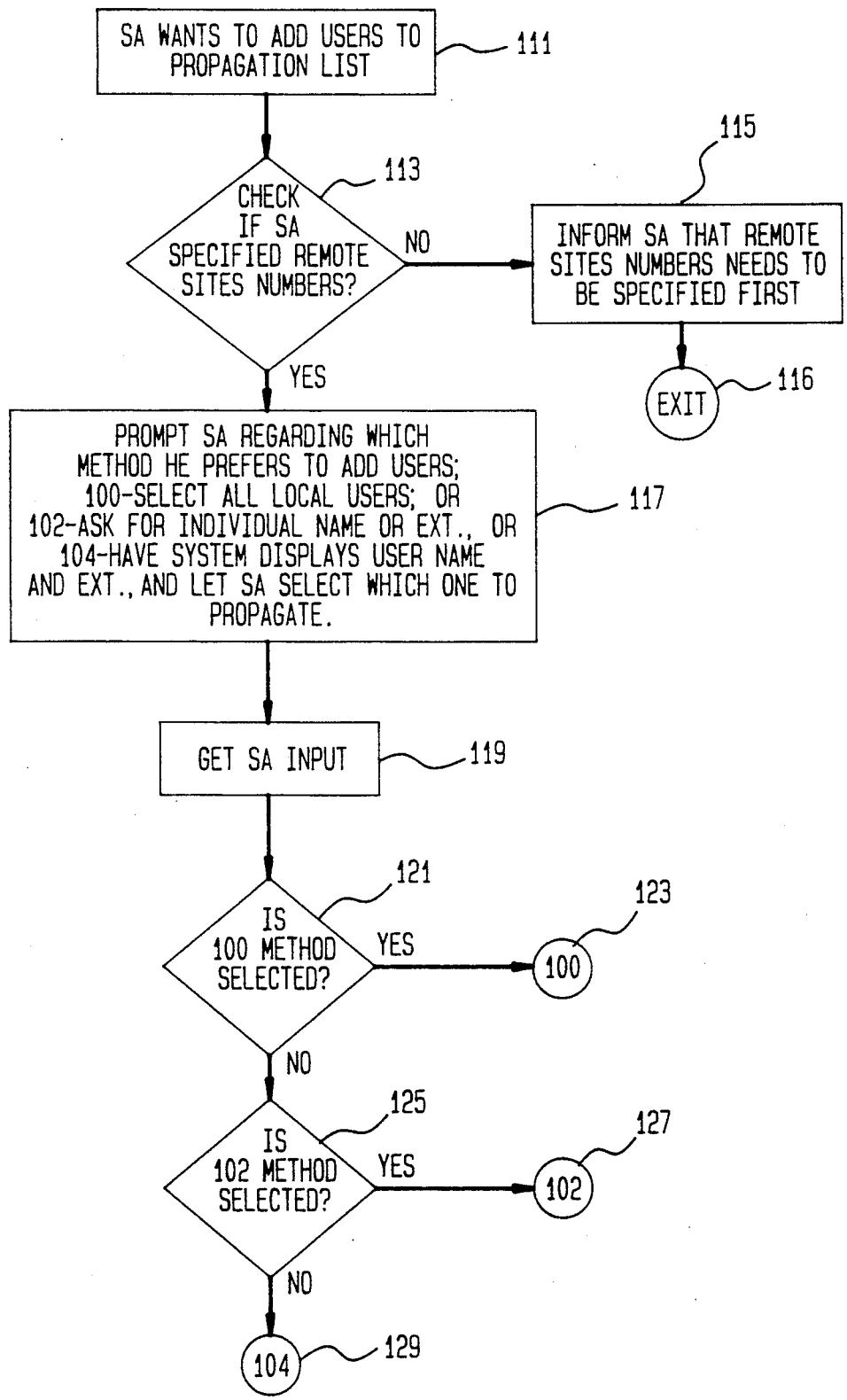

After selecting the remote site numbers as indicated, the SA then must proceed to specify the local users to whom he wants to propagate or send the profiles. With reference to FIG. 9A, block 111 assumes that the SA is now addressing the terminal 27 for requesting initiation of the routine for specifying local users for the profile propagation. As shown in the flowchart, the program step 113 confirms whether the SA has specified remote site numbers. If not, step 115 is initiated to inform the SA that he must first specify remote site numbers. After giving that message, the system then proceeds to exit from the routine as shown by balloon or step 116 to permit the SA to enter into the routine of FIG. 8. Alternatively, if the SA has specified remote site numbers, the program proceeds to step 117 to prompt the SA to select one of three methods for specifying or adding users. As shown, he can select method 100 for selecting all local users; or method 102 for selecting via individual names of users or extensions; or method 104 for requesting the system to display all of the user names and extensions in the local data base 57, whereby the SA will select which ones of these names to propagate.

At block 119, the input or method selected by the SA is obtained, and at block 121 it is determined whether the first method is selected. If the first method is selected then the routine jumps to subroutine 100 shown in FIG. 9B, as indicated by block 123. If the "100" method is not selected, at block 125 it is determined whether the second method "102" has been selected. If the answer is "yes", the routine for method "102" is pursued as shown by block 127. The later routine is shown in FIG. 9C. If it is determined that method "102" has not been selected, then the third "104" routine is entered into as shown at step 129, with the flowchart for method "104" shown in FIG. 9D. The three methods "100", "102", and "104" will each now be described in detail below.

Figure 9B:
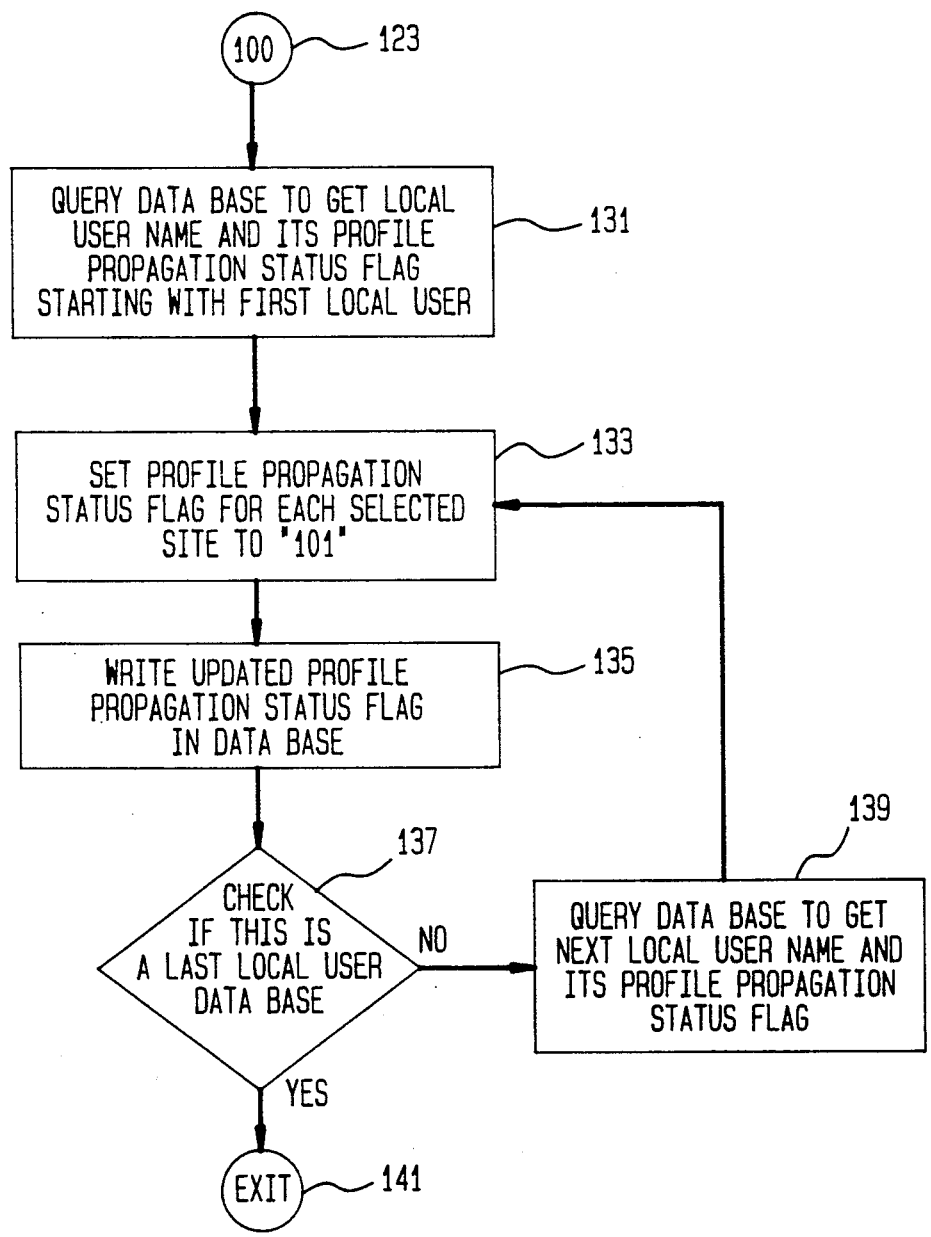
Figure 9C:
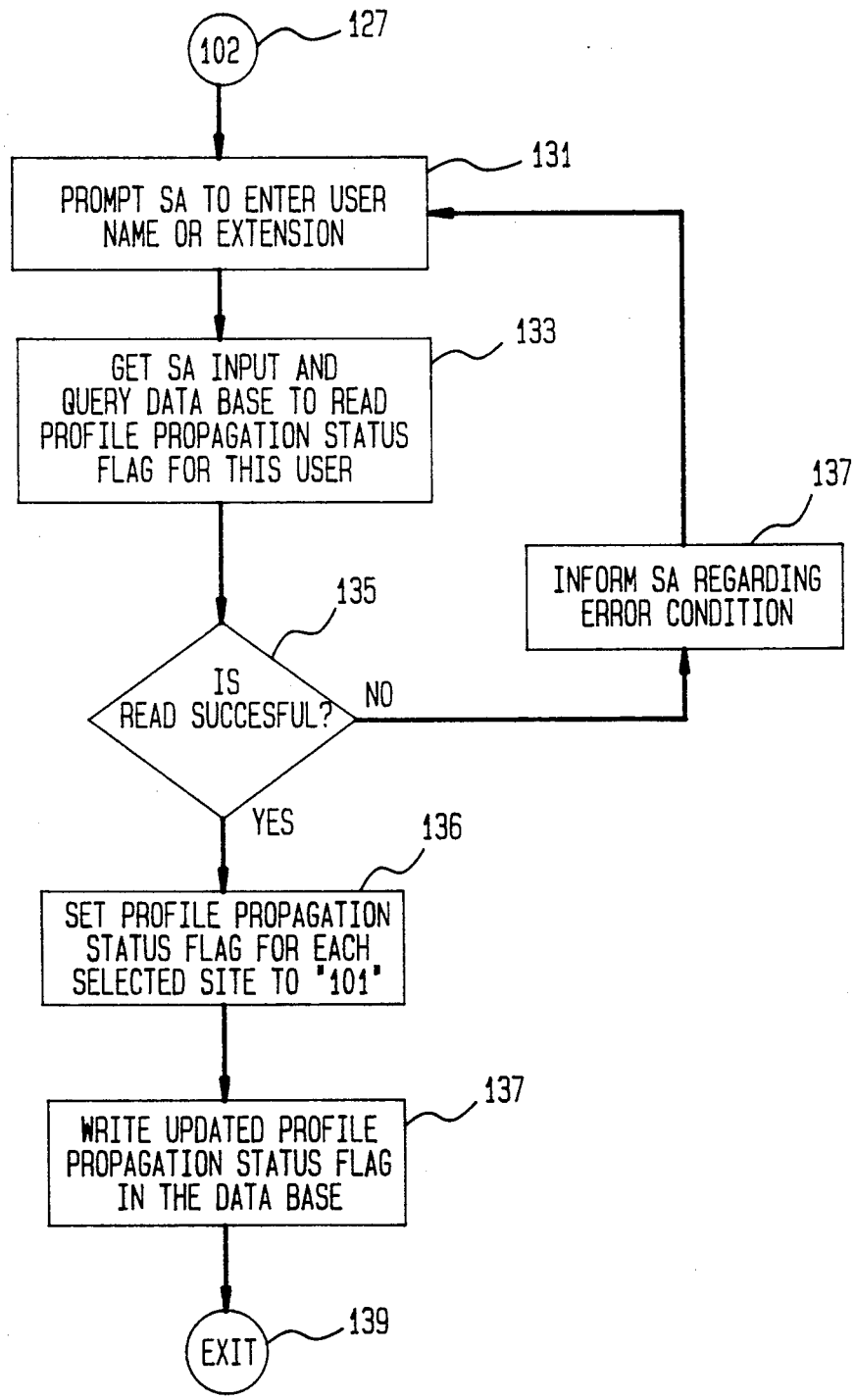

As shown in FIG. 9B, the programming routine for method "100" is initiated at block 123, as previously mentioned. Next, at block 131 the appropriate data base 57, for example, is queried to obtain the local user name and associated profile propagation status flag with the routine starting with the first local user and continuing for other users in alphabetical order, in this example. Note other configurations may use other than an alphabetical ordering. Next, at step or block 133 the profile propagation status flag for each selected site is set to "101". At step 135 the updated profile propagation status flag is written into the data base 57, in this example. Next, at step 137 it is determined whether the present local user selected is the last user in the data base 57. If not, at 139 the data base 57 is then queried to obtain the next local user name and associated profile propagation status flag, whereafter step 133 is then initiated as previously described. If the local user is identified as the last local user, then the routine is exited at step 141.

If the SA chooses method "102" for selecting users, the software routine shown in the flowchart of FIG. 9C is entered into. At block 131, the SA is prompted to enter the user name or extension. At block 133, the SA's input is received, and the system next queries the data base 57 to read or retrieve the profile propagation status flag for the designated user. At block 135, it is determined whether the read made in block 133 was successful. If not, at step or block 137 the SA is informed of the error condition. If the read is successful at block 135, the programming proceeds to block 136 to set the profile propagation status flag for each selected site to "101". Thereafter, step 137 is initiated to write the updated profile propagation status flag into the data base 57, in this example, followed by exiting the routine at step 139.

Figure 9D:
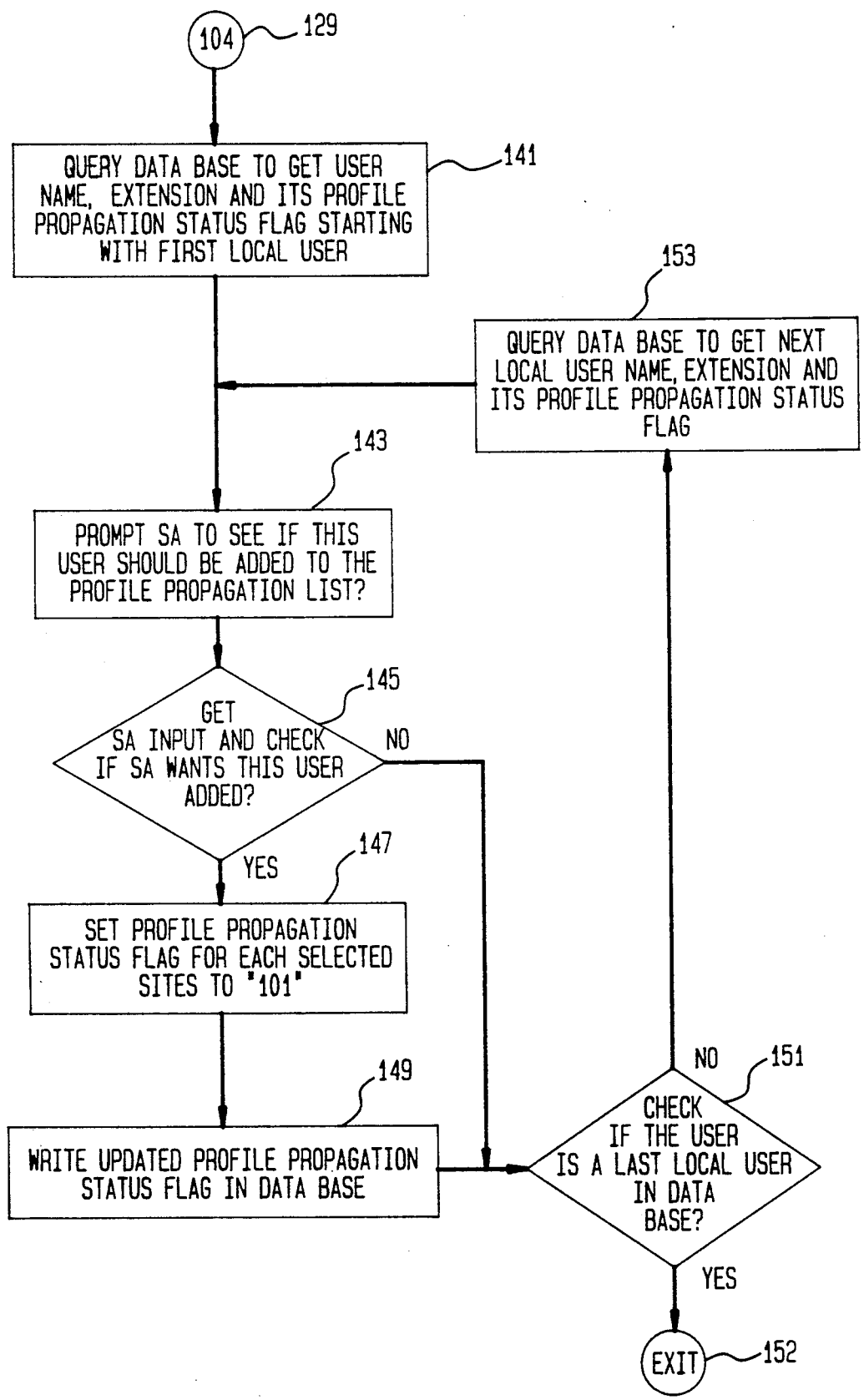

If method 104 is chosen for selecting local user names or extensions to propagate, the steps shown in FIG. 9D are carried out. More specifically, at step 141 the data base 57, in this example, is queried to obtain a local user name and extension and associated profile propagation status flag, with the first local user in alphabetical order being the first local user in the data base 57. Note that retrieval can be in other than alphabetical order. Next, at step 143, the SA is prompted to inquire whether the identified local user should be added to the profile propagation list. At step 145, the SA's response is monitored and it is indicated that the present is to be added then step 147 is pursued to set the profile propagation status flag for each selected sites to "101". Thereafter, step 149 is initiated to write the updated profile propagation status flag into the data base 57, in this example, followed by continuing to step 151. At step 145, the SA's response indicates that the present user is not to be added, then step 151 is pursued to determine if the present user retrieved is the last local user in data bank 57. If the answer is "yes", step 152 is pursued for exiting from the system. However, if in step 151 it is determined that the user is not the last local user, then step 153 is next initiated for querying data base 57 to obtain the next local user name or extension and associated profile propagation status flag whereafter steps 143, 145, 147 and 149 are pursued as previously indicated.

Figure 10:
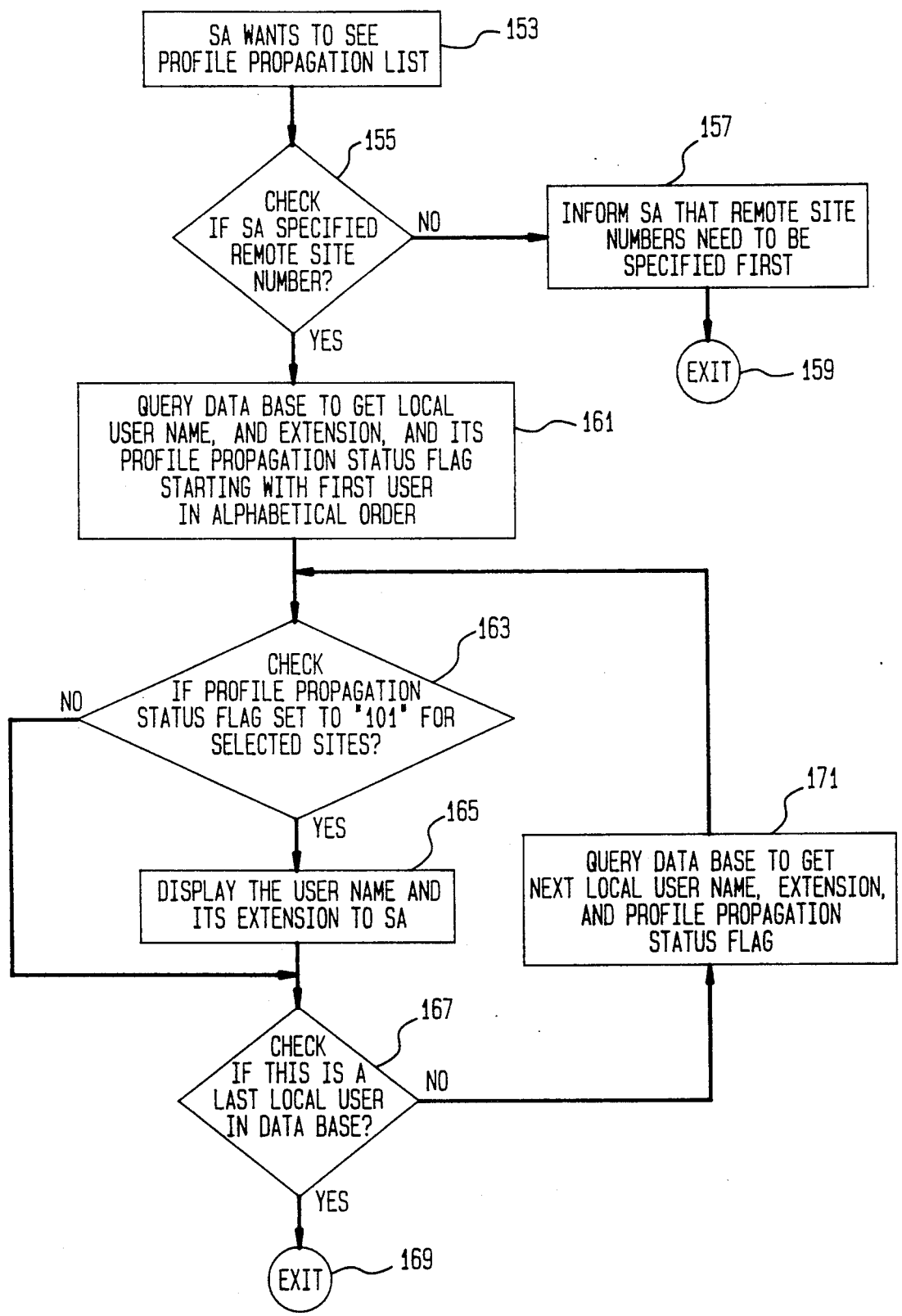

After specifying local users for the profile propagation, the system permits the SA to review the profile propagation list before starting the actual propagation. In FIG. 10, a flowchart is shown of the routine for providing the SA this function. At block 153, the SA has determined that he does desire to see the profile propagation list. The system responds at block 155 by first checking to determine if the SA has specified remote site numbers. If the answer is "no", the SA is prompted to indicate that remote site numbers must be specified before proceeding as indicated at step 157. Thereafter, the routine is exited as shown at step 159. However, if the SA did specify remote site numbers as determined at block 155, the next step 161 involves querying data base 57 to obtain a user name, extension, and associated profile propagation status flag, with the starting point being the first local user taken in alphabetical order in data base 57, in this example. Next at 163, it is determined whether the profile propagation status flag is set to "101" for selected sites. If the answer is "yes", the retrieved user name and extension is displayed to the SA at block 165. If the answer is "no", the next step pursued is step 167, which is also the next step pursued after step 165. In step 167, it is determined whether the present user is the last local user in data base 57. If the answer is "yes", the routine is exited at 169. If the answer is "no", step 171 is pursued for querying the data base 57 to obtain the next local user's name and extension, and that user's associated profile propagation status flag, whereafter steps 163, 165 and 167 are pursued as previously indicated.

Figure 11A:
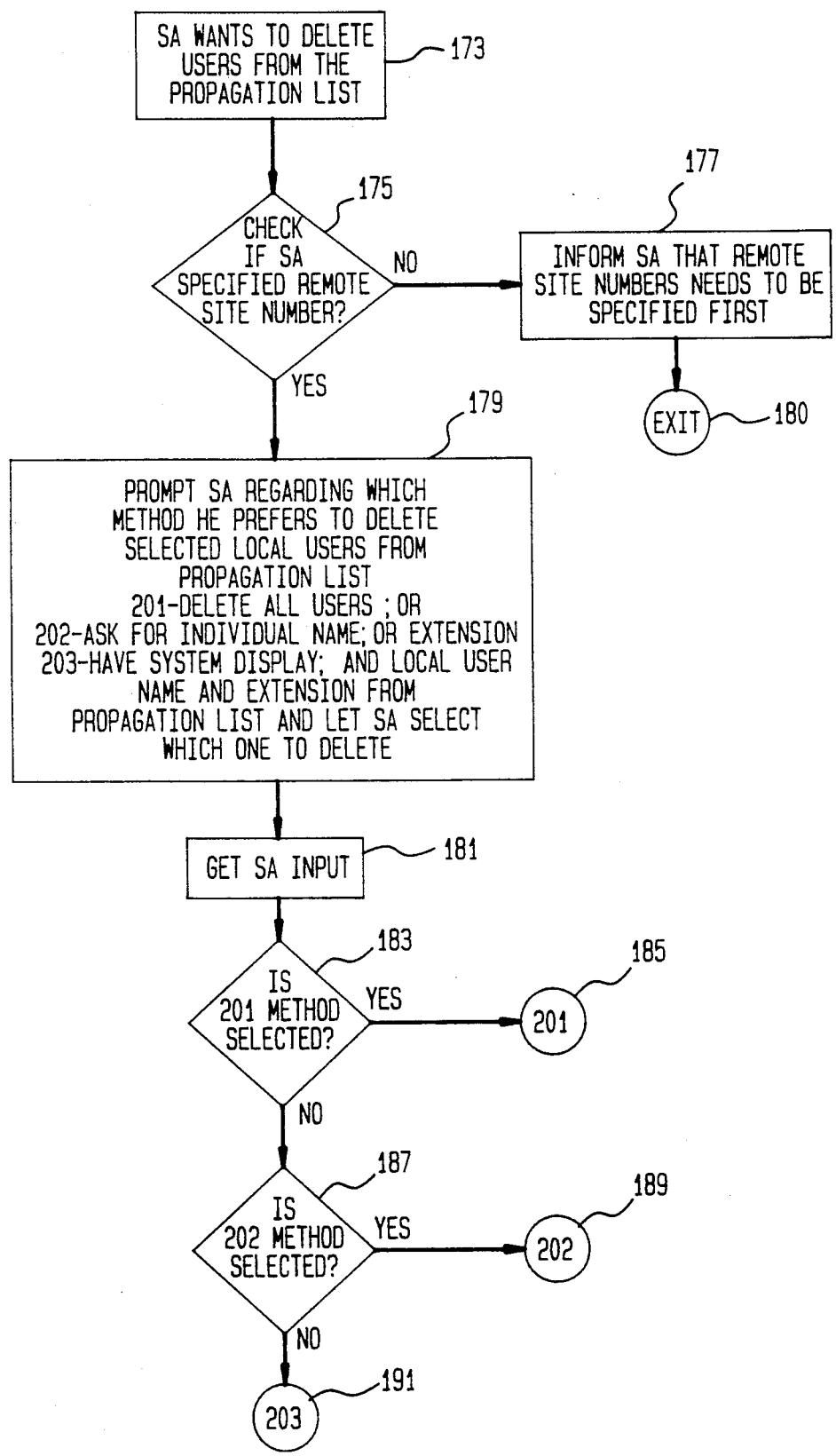

The SA can delete users chosen for the profile propagation list by entering into the flowchart routine shown in FIG. 11A. At block 173, the SA advises that users are to be deleted from the propagation list. Next, at step 175, it is determined if the SA specified remote site numbers. If not, as shown in step 177 a prompting message is given to the SA indicating that remote site numbers must be specified, and thereafter the routine is exited as indicated in step 180. If the SA has specified remote site numbers, then step 179 is pursued after 175 for prompting the SA to indicate which one of three methods he prefers for deleting users from the propagation list. As indicated, these methods include routine 201 for deleting all selected local users; or routine 202 for requesting individual user names or extensions for deletion; or routine 203 for having the system display local user names and extensions from the propagation list, for permitting the SA to select which ones of those names to delete. Next at step 181, the method selected in 179 is obtained for analysis in succeeding steps. In step 183, it is determined whether method 201 has been selected. If the answer is "yes", the 201 routine is entered at 185, whereas if the answer is "no", step 187 is pursued for determining whether method 202 was selected. If the answer is "yes", the routine for method 202 is pursued at 189. However, if method 202 was not selected, then step 191 is pursued for initiating the routine for method 203. Methods 201 through 203 will now be described as initiated at steps 185, 189, and 191, respectively.

Figure 11B:
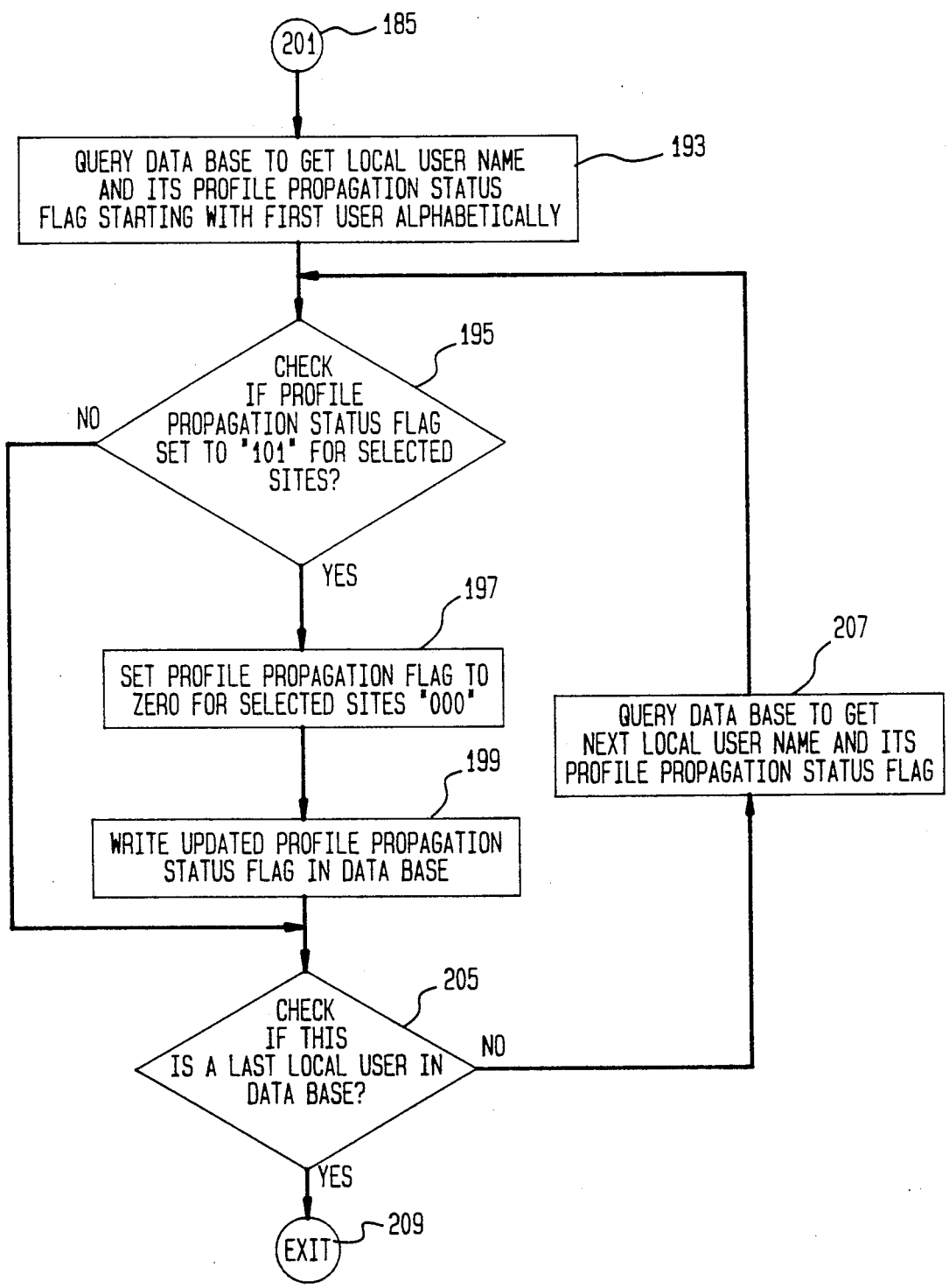

Method 201 is initiated at 185 as shown in FIG. 11B. At 193, the data base 57 is queried to obtain a local user name and associated propagation status flag beginning with the first local user. Step 195 is next pursued to determine if the profile propagation status flag is set to "101" for selected sites. If the answer is "yes", step 197 is pursued to set the profile propagation status flag to zero (000), for selected sites. Thereafter at step 199, the profile propagation status flag is updated in the data base 57, in this example. If in step 195, it was determined that the propagation status flag is not set to "101" for selected sites, step 205 is pursued. This step is also pursued immediately after step 199, and provides for determining if the present local user is the last local user in data base 57. If the answer is "no", step 207 is pursued for querying data base 57 to obtain the next local user name and associated propagation status flag. Next step 195 is pursued as previously described. If however in step 205 it is determined that the present local user is the last local user in data base 57, next step 209 is pursued for exiting from this user deletion mode of operation.

If method 202 is selected for deleting users, steps shown in the flowchart of FIG. 11C are pursued. At step 211, the SA is prompted to enter a local user name or associated extension. Next, at step 213, the response from the SA is received, and data base 57 is queried to read the profile propagation status flag for the selected local user. Next at 215, it is determined if the read operation in step 213 was successful. If not, at step 217, the SA is informed that an error has occurred, and thereafter the routine is exited at 219. If however the read is successful, the next step pursued is 221 for determining whether the profile propagation status flag is set to "101" for selected sites. If the answer is "no", step 217 is pursued as previously indicated. If the answer is "yes", step 223 is pursued for setting the profile propagation status flag to zero, that is "000", for each selected site. Next, step 225 for writing the updated profile propagational status flag into data base 57 is completed, and thereafter the routine is exited at 227

Figure 11D:
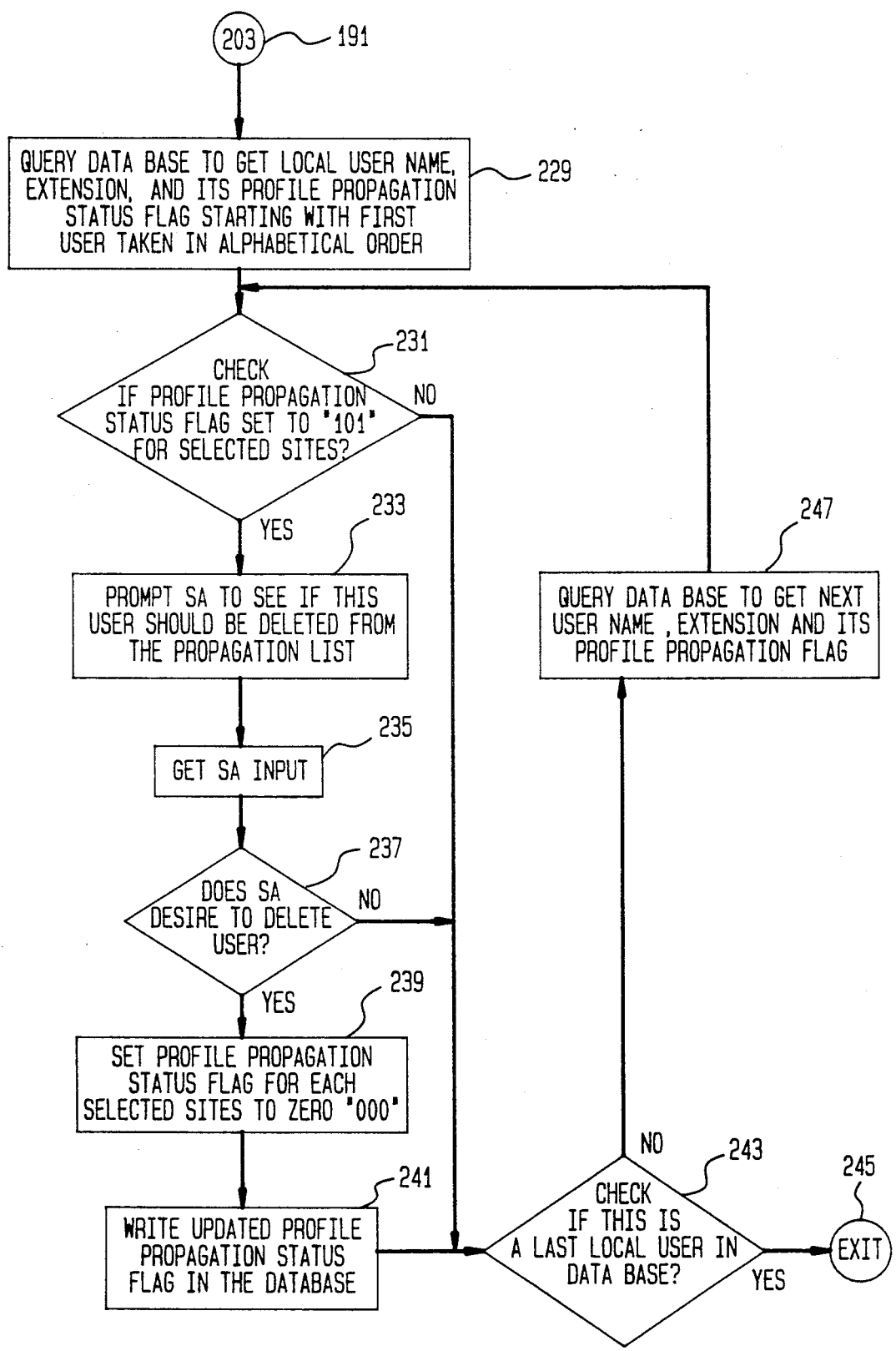

The flowchart shown in FIG. 11D is pursued if method 203 is selected in step 179 of the flowchart of FIG. 11A. Method 203 is initiated at step 229 for querying data base 57 to obtain a local user name, extension, and profile propagation status flag starting with the first local user taken in alphabetical order, in this example. Next, step 231 is pursued to determine if the profile propagation status flag is set to "101" for the selected sites. If the answer is "yes", step 233 is pursued for prompting the SA to determine if the user retrieved should be deleted from the propagation list. At step 235, the SA's response is obtained, and next in step 237, it is determined whether the SA desires to delete the user. If the answer is "yes", step 239 is pursue for setting the profile propagation status flag for each selected sites to zero ("000"). Next, in step 241 the updated profile propagation status flag is written into data base 57. Next, in step 243, it is determined if the present local user is the last local user in data base 57. If the answer is "yes", the routine is exited at step 245. If the answer is "no", step 247 is pursued for querying the data base to obtain the next local user name, extension, in the data base and the associated profile propagation status flag. Thereafter, step 231 is pursued as previously indicated.

If in step 231 it is determined that the profile propagation status flag is not set to "101" for selected sites, step 243 is next pursued as previously described. Similarly, if in step 237 it is determined that the SA does not desire to delete the present user step 243 is then next pursued.

Figure 12:
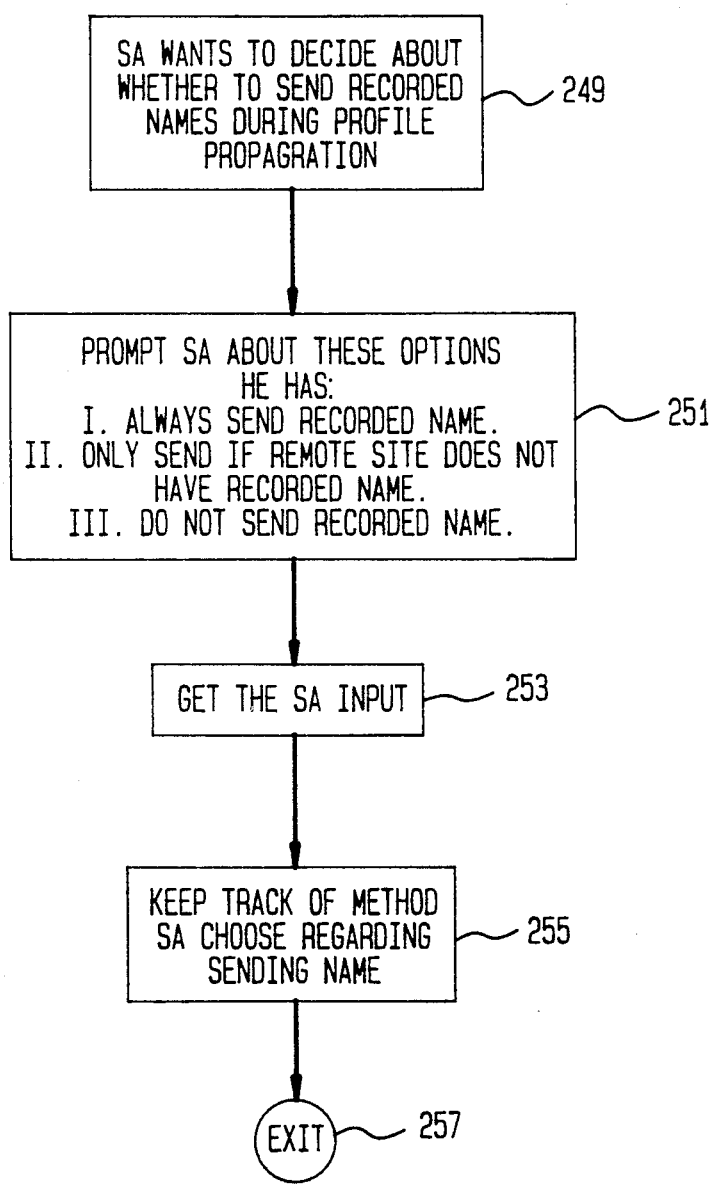

If it is assumed that the SA believes that the propagation list is correct, the SA must now specify whether to send a recorded name or negate the transmission thereof during profile propagation. The steps for accomplishing this are shown in the flowchart of FIG. 12. In step 249, the SA determines whether recorded names are to be sent or transmitted during the profile propagation to the remote sites. Next, in step 251, the SA is prompted to select one of three options. A first option is to always send a recorded name, that is to transmit all recorded names to remote sites. A second option is to only send a recorded name to a remote site if the particular site does not already have that recorded name in its associated data base. The third option is to not send a particular recorded name or names. Next, in step 253 the method selected by the SA is obtained. The next step is to retain o keep track of the option that the SA has selected for sending names as indicated in step 255. Thereafter, as shown in step 257, the routine is exited.

Figure 13:
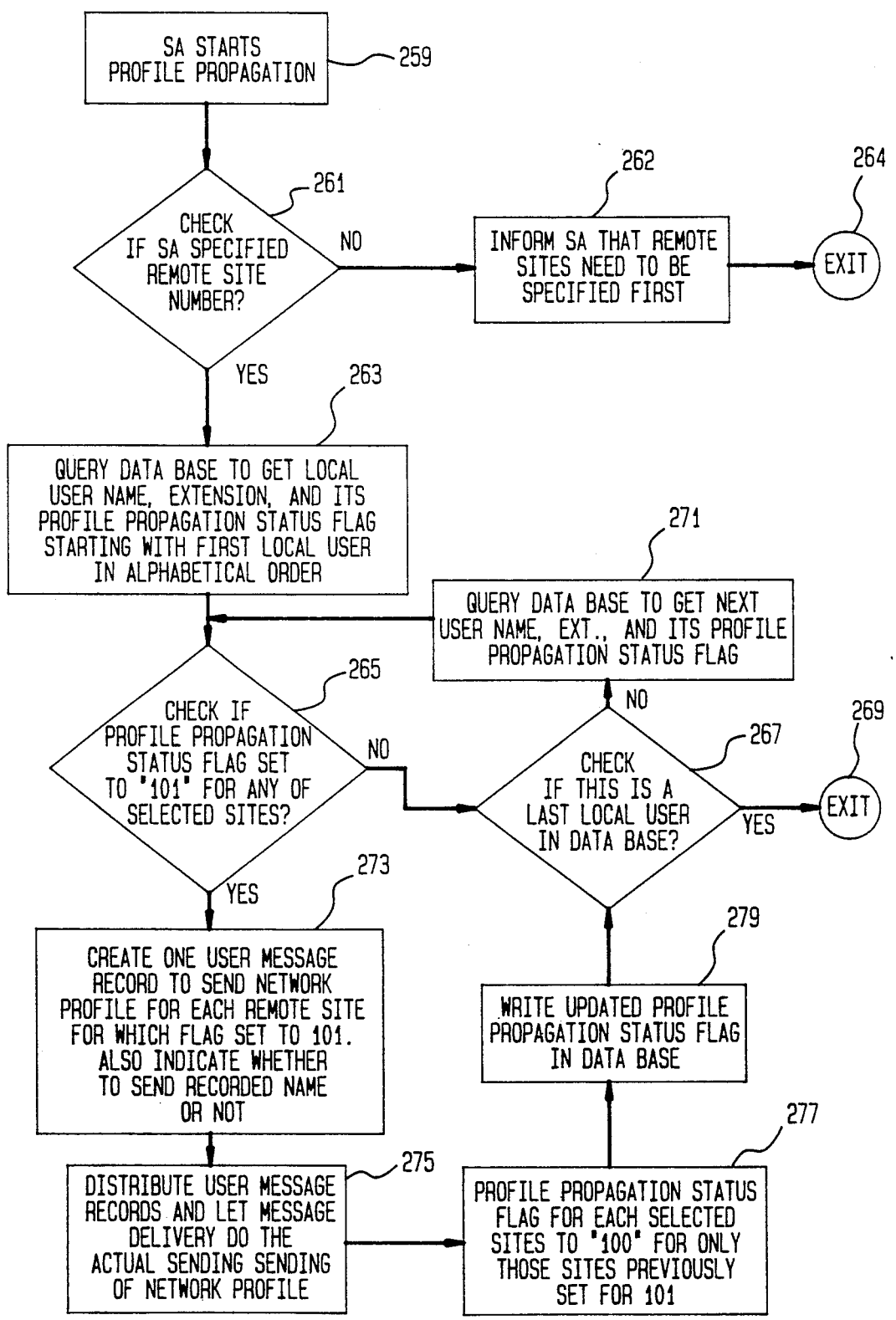

The SA has now completed specifying all of the necessary information, and is in a position to initiate the profile propagation. In the flowchart of FIG. 13, the steps are detailed for showing the SA's interaction with the PhoneMail System 5 for creating and distributing user message records (UMR's) 33, in this example, to send network profiles to the selected remote sites. At step 259 the SA starts or initiates the profile propagation. The system 5 responds as in step 261 for determining whether the SA has specified remote site numbers. If the answer is "no", step 262 is pursued for informing the SA that remote sites must be specified before proceeding, whereafter the routine is exited as indicated by step 264. However, if in step 261 it is determined that the SA has specified remote site numbers, step 263 is pursued. In this latter step the data base 57 is queried to obtain a local user name, extension and associated profile propagation status flag, beginning with the first local user 19 taken in alphabetical order, in this example. Next, at block or step 265, the system 5 determines whether the profile propagation status flag is set to "101" for any of the selected sites. If the answer is "no", step 267 is pursued for checking whether the present local user is a last local user stored in data base 57. If the answer is "yes", exit step 269 is pursued. If the answer is "no", the data base is queried to obtain the next local user name, and extension, and associated profile propagation status flag via step 271. Thereafter, step 265 is again pursued.

If in step 265 it is determined that the profile propagation status flag is set to "101" for any of the selected sites, step 273 is pursued for creating one user message record for sending or transmitting the network..profile for each of the selected remote sites for which the propagation status flag is set to "101". Also, an indication is provided as to whether the recorded name is to be transmitted. Next, step 275 is pursued for distributing user message records, and permitting the message delivery 3 (see FIG. 5) to perform the actual transmission of network profiles. Next, in step 277 for each of the selected sites whose profile propagation status flag was set to "101", the profile propagation status flag is changed therefor to "100". Thereafter, in step 279, the updated profile propagation status flag is written into data base 57, in this example. Step 267 is pursued next as previously described.

Figure 14:
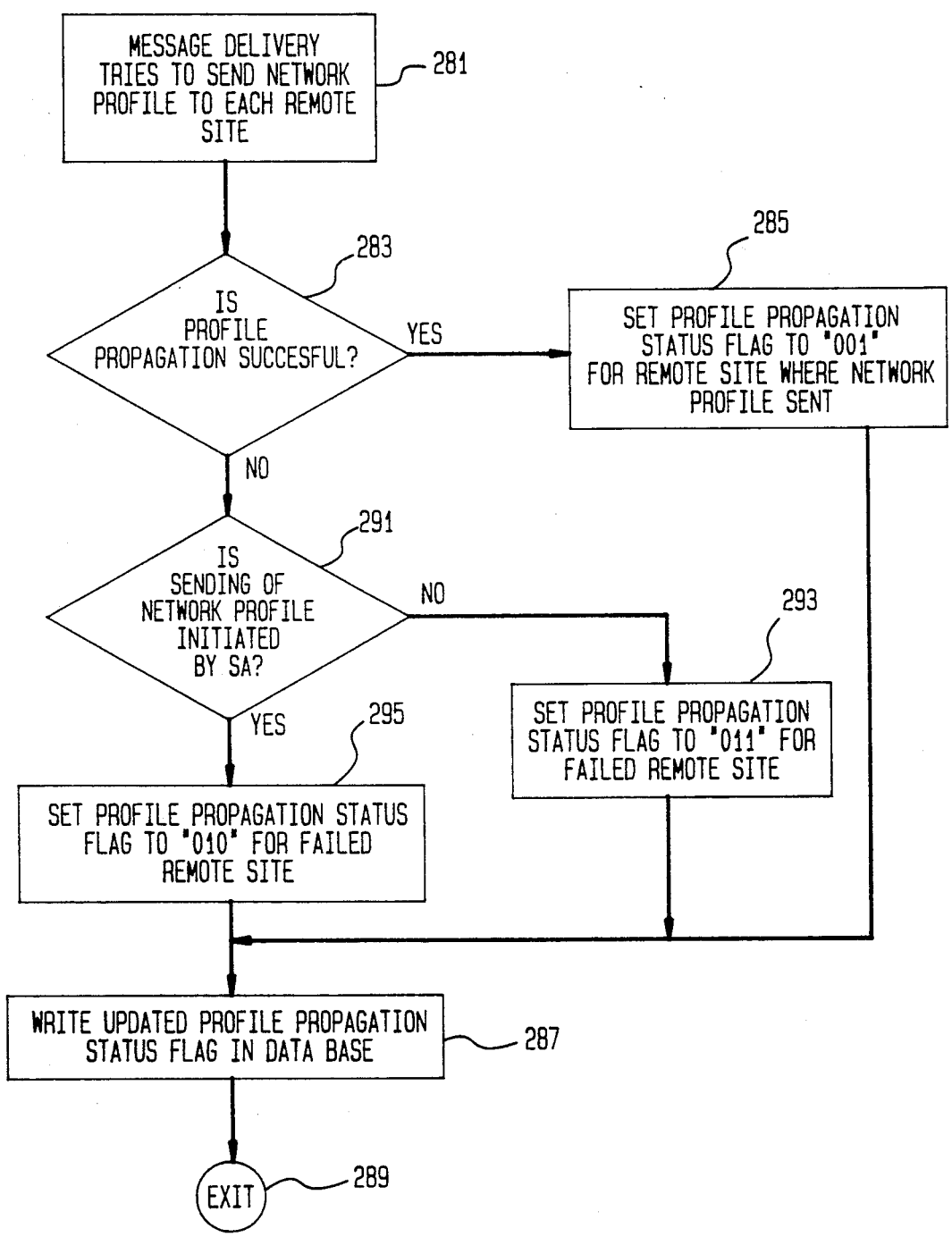

In FIG. 14, a flowchart is shown of the steps that must be taken subsequent to the message delivery module 35 attempting to deliver a network profile to a remote site. As shown, in step 281 when it is determined that the message delivery module 35 has attempted to send a network profile to a selected remote site, the next step 283 is pursued for determining whether the profile propagation was successful. If the answer is "yes", step 285 is pursued for setting the profile propagation status flag to "001" for the remote site where the network profile was sent. Thereafter step 287 is pursued for writing the updated profile propagation status flag into data base 57, in this example, and thereafter the routine is executed as indicated in step 289.

If in step 283 it is determined that the profile propagation has not been successful, step 291 is pursued for determining whether the SA initiated the sending of the network profile. If the answer is "no", step 293 is pursued for setting the profile propagation status flag to "011" for the failed remote site. If, on the other hand, the answer is "yes", step 295 is pursued for setting the profile propagation status flag to "010" for the failed remote site. The next step pursued after either one of steps 295 or 293 is step 287, as previously described.

Figure 15:
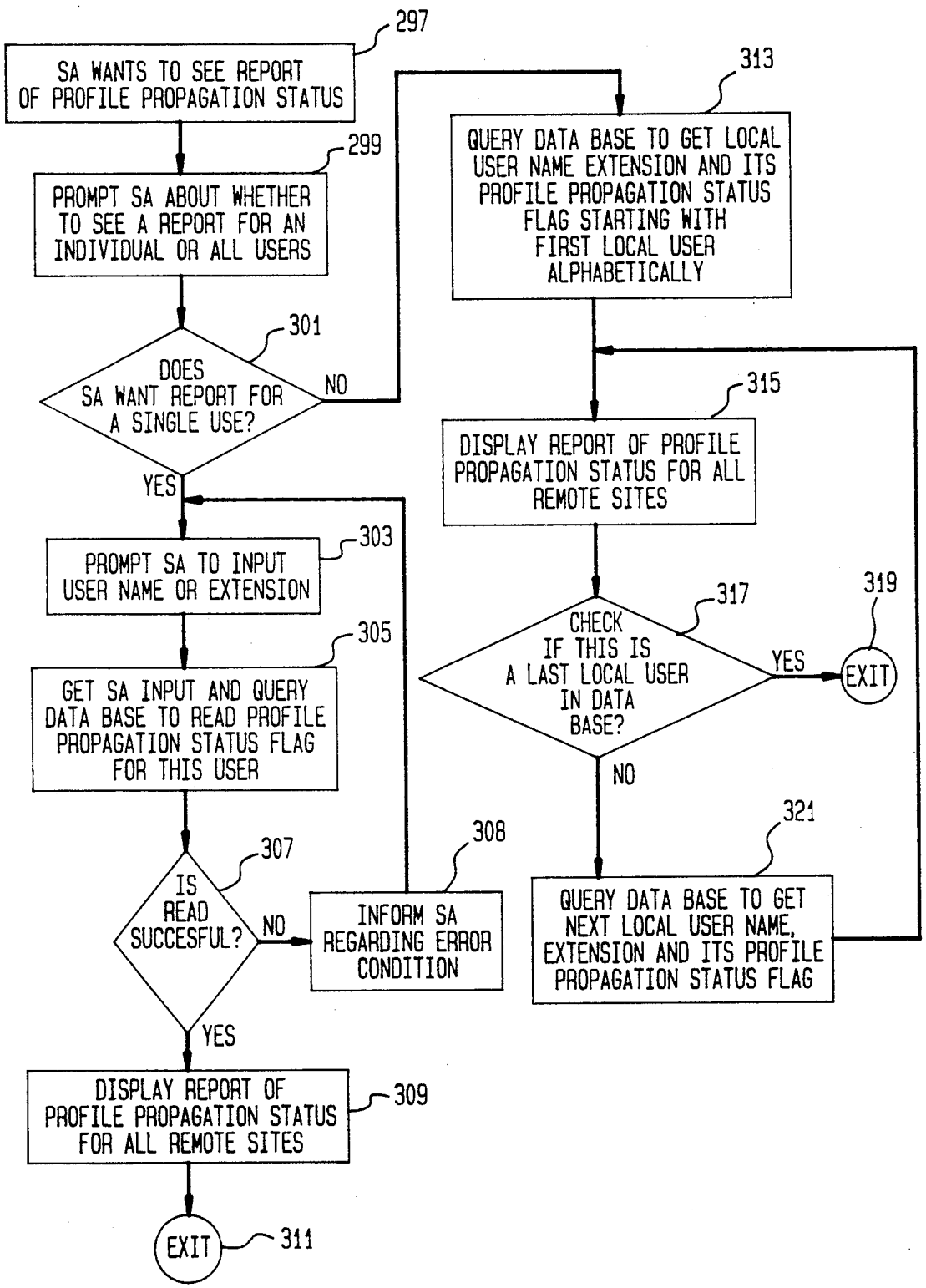

When the SA interacts with the PhoneMail t request viewing of the profile propagation status report, the routine pursued is as shown by the flowchart of FIG. 15. Step 297 indicates that the SA has requested viewing of the report of the profile propagation status. The system responds in step 299 by prompting the SA to advise whether a report for an individual user is desired, or a report showing all users is desired. When the SA responds, step 301 is pursued for determining whether the SA wants the report for a single user. If the answer is "yes" step 303 is pursued for prompting the SA to provide a desired user name or extension. Next step 305 is pursued to obtain the information from the SA and query the data base 57, for example, to read out the profile propagation status flag for the selected user. Next at step 307, it is determined if the send operation in step 305 was successful. If not, at step 308, the SA is informed that an error has occurred and thereafter step 303 is repeated or described above. If however the send is successful, the next step pursued is 309 to display a report of the profile propagation status for all remote items to the SA. Thereafter the routine is exited at step 319.

If in step 301 the SA did not want a report for a single user, step 313 is entered for querying data base 57 to obtain every local user name, extension, and associated profile propagation status flags beginning with the first local user in alphabetical order, in this example. Thereafter, step 315 is initiated for displaying a report of the profile propagation status for all of the remote sites to the SA. Next, step 317 is entered for determining whether the local user currently displayed is a last local user in data base 57. If the answer is "yes", the system exits from this routine as shown by step 319. However, if the answer is "no", step 321 is pursued for querying the data base to obtain the next local user name, extension, and associated profile propagation status flag, whereafter step 315 is then pursued as previously described.

In FIG. 16, an example of hardware architecture for a PhoneMail system incorporating the present invention is shown. As shown, the hardware includes a host processor 401 that can be provided by a PC/AT type personal computer, commonly known as a 286 based personal computer. The processor 401 is connected via a high speed bus 403 to a PhoneMail voice processor subsystem 405, and via another bus 407 to a line card interface subsystem 409 providing other necessary electronics for the system.

In FIG. 17, an illustration of typical software architecture for a PhoneMail system 5 incorporating the present invention is shown. Note that reference designations show in FIG. 17 are indicative of identical modules as shown in FIG. 3, in addition to other items shown in FIG. 17. Also shown are a voice file server 411, a voice channel protocol handler 413, a driver 415 for driving a high speed bus, such as a PC/AT bus 417. The bus 417 interconnects driver 415 to associated software 419 in digital signal processing boards for 421. The signal processing network is connected via a TDM bus 423 to required firmware 425. Both the hardware configuration of FIG. 16, and the software configuration of FIG. 17 are generally known in the art, absent the present invention. As described above, the present invention is incorporated into such a conventional PhoneMail system.

Various embodiments of the invention have been shown and described herein for purposes of illustration, but are not meant to be limiting. Those of skill in the art may recognize certain modifications to these embodiments, which modifications are meant to be covered by the spirit and scope of the appended claims. For example, the present invention is also useful in voice messaging systems either incorporating a facsimile capability or dedicated to a facsimile capability only using tone messaging.

What is claimed is:

1. In a messaging network including a plurality of messaging systems at different sites, respectively, a method for automatically propagating network profiles of individual subscriber names, extensions, and associated name headers to remote sites from a local site, the method comprising the steps of:
  adding a profile propagation status field to a data base field for each mailbox of a subscriber in each of said plurality of messaging systems;
  reserving a predetermined number of bits within said profile propagation status field for each associated remote site, for representing the status at any given subscriber network profile relative to a corresponding remote site, with different patterns of said reserved bits conveying different status messages;

specifying in a local system each of that system's subscriber network profiles that are to be propagated to selected remote sites;

selecting each one of said remote sites for propagating thereto said specified subscriber network profiles at a local site; and propagating the network profiles of the specified local subscribers to a data base at each one of said selected remote sites.

2. The method of claim wherein said specifying step further includes the step of selecting from one of three possible specifying modes, a first mode being for specifying single subscriber, a second mode being for specifying all subscribers, and a third mode being for showing on a display of the associated system all local subscriber names, extensions, and related name headers for specifying therefrom the subscribers for propagation.

3. The method of claim 1, wherein said reserving step includes reserving three bits for representing the status of an associated subscriber network profile.

4. The method of claim 3, wherein said reserving step further includes the step of establishing a bit pattern of "000" for indicating that no attempt has ever been made to propagate an associated subscriber network profile.

5. The method of claim 3, wherein said reserving step further includes the step of establishing a bit pattern of "001", for indicating that the network profile of an associated subscriber was successfully propagated.

6. The method of claim 3 wherein said reserving step further includes the step of establishing a bit pattern of "010", for indicating that propagation of an associated subscriber network profile failed.

7. The method of claim 3, wherein said reserving step further includes the step of establishing a bit pattern of "011", for indicating that the network profile propagation failed, as initiated by a normal PhoneMail message delivery operation.

8. The method of claim 3, wherein said reserving step further includes the step of establishing a bit pattern of "100", for indicating that a network profile propagation is in progress.

9. The method of claim 3, wherein said reserving step further includes the step of establishing a bit pattern of "101", for indicating that a network profile selected for propagation has yet to be propagated.

10. The method of claim 3, wherein said reserving step further includes the step of resetting a bit pattern to "000" for a new subscriber associated with a new mailbox added in the data base at the new subscriber's local site.

11. The method of claim 3, further including the steps of:

establishing a bit pattern of "000" for indicating that no attempt has ever been made to propagate an associated subscriber network profile;

establishing a bit pattern of "001" for indicating that the network profile of an associated subscriber was successfully propagated;

establishing a bit pattern of "010" for indicating that propagation of an associated subscriber network failed;

establishing a bit pattern of "011" for indicating that the network profile propagation failed, as initiated by normal PhoneMail message delivery operation;

establishing a bit pattern of "100" for indicating that a network profile propagation is in progress; and establishing a bit pattern of "101" for indicating that a network profile selected for propagation has yet to be propagated.

12. The method of claim 11, further including after initiation of said propagating step, the steps of:

querying the profile propagation status for each mailbox of s id specified subscribers; and sending the network profile to a selected remote site if the propagation status flag for the mailbox is "101".

13. The method of claim 12, further including the step of updating a profile propagation status to "100" upon initiating the propagation of the network profile in said sending step.

14. The method of claim 13, further including the step of updating the profile propagation status to "001" upon successfully completing the transmission of the network profile to a selected remote site.

15. The method of claim 13, further including the step of updating the profile propagation status to "010" if the transmission or propagation of the network profile to a selected remote site cannot be completed or fails.

16. The method of claim 1, propagating step further includes the step of automatically sending a specified sending subscriber network profile to a selected remote site upon the subscriber sending a message thereto.

17. The method of claim 16, further including the step of setting a profile propagation flag to "011" if said automatic sending step fails to complete the transmission of the sending subscriber network profile.

18. The method of claim 1, wherein each of said messaging systems includes a terminal having at least a keyboard and a display for use by a supervisory administrator, and wherein said method further includes:

installing a propagate network profile utility module in each of said messaging systems, for permitting said supervisory administrator to control said specifying, selecting, and propagating steps via said terminal.

19. The method of claim wherein said propagating step further includes:

installing a message delivery module in each of said messaging systems;

programming said message delivery module for detecting when a message is pending for transmission to a remote site, and upon making such a detection communicating with said selected remote site for sending an associated subscriber network profile thereto.

20. The method of claim 1, wherein said reserving step further includes the step of programming a message delivery module for interacting with a data base manager for updating a propagation status flag, and interacting with a network mailbox server for managing a user records file.

* * * * *